United States Patent
Watanabe

(10) Patent No.: US 12,019,901 B2
(45) Date of Patent: Jun. 25, 2024

(54) MEMORY SYSTEM CONNECTABLE TO A HOST AND INCLUDING A NONVOLATILE MEMORY AND A CONTROLLER ELECTRICALLY CONNECTED TO THE NONVOLATILE MEMORY

(71) Applicant: Kioxia Corporation, Tokyo (JP)

(72) Inventor: Shuichi Watanabe, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 100 days.

(21) Appl. No.: 17/842,030

(22) Filed: Jun. 16, 2022

(65) Prior Publication Data

US 2023/0153013 A1    May 18, 2023

(30) Foreign Application Priority Data

Nov. 12, 2021    (JP) .................................. 2021-184923

(51) Int. Cl.
*G06F 3/06*    (2006.01)

(52) U.S. Cl.
CPC ............ *G06F 3/0653* (2013.01); *G06F 3/061* (2013.01); *G06F 3/0679* (2013.01)

(58) Field of Classification Search
CPC ...... G06F 3/061; G06F 3/0611; G06F 3/0653; G06F 3/0659; G06F 3/0679; G11C 16/0483; G11C 16/26; Y02D 10/00
See application file for complete search history.

(56) References Cited

U.S. PATENT DOCUMENTS

| | | | |
|---|---|---|---|
| 10,466,903 B2 | 11/2019 | Benisty et al. | |
| 2014/0173149 A1* | 6/2014 | Walker | G06F 13/4221 710/263 |
| 2016/0124647 A1* | 5/2016 | Kim | G06F 3/0659 711/167 |
| 2016/0124874 A1 | 5/2016 | Hassan | |
| 2019/0214091 A1* | 7/2019 | Lee | G11C 16/349 |
| 2019/0369911 A1* | 12/2019 | Rai | G06F 3/0679 |
| 2021/0096770 A1 | 4/2021 | Yamaguchi | |
| 2021/0216248 A1* | 7/2021 | Kanamori | G06F 3/0679 |

FOREIGN PATENT DOCUMENTS

JP    2021-056550 A    4/2021

* cited by examiner

*Primary Examiner* — Larry T MacKall
(74) *Attorney, Agent, or Firm* — Oblon, McClelland, Maier & Neustadt, L.L.P.

(57) ABSTRACT

According to one embodiment, when completion of a program operation or a sense operation corresponding to a second I/O command is detected in a first period after a first completion response indicating completion of a first I/O command is transmitted to a host and before transmission of an interrupt to the host is started, a controller waits for completion of a data write operation or a data read operation corresponding to the second I/O command, without transmitting the interrupt. In response to detecting the completion of the data write operation or data read operation, the controller transmits a completion response indicating completion of the second I/O command to the host, and transmits the interrupt to the host.

20 Claims, 15 Drawing Sheets

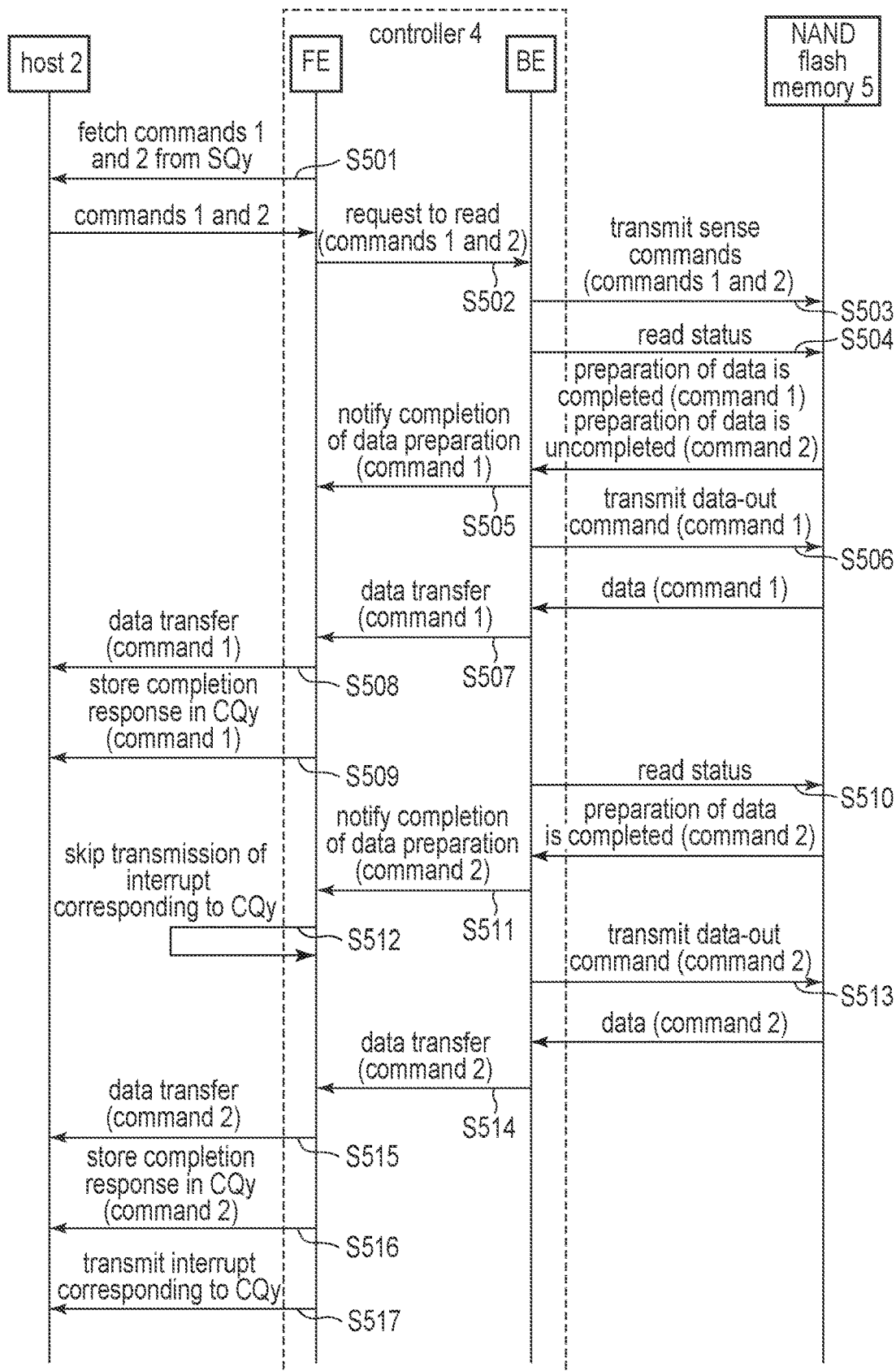
F I G. 5

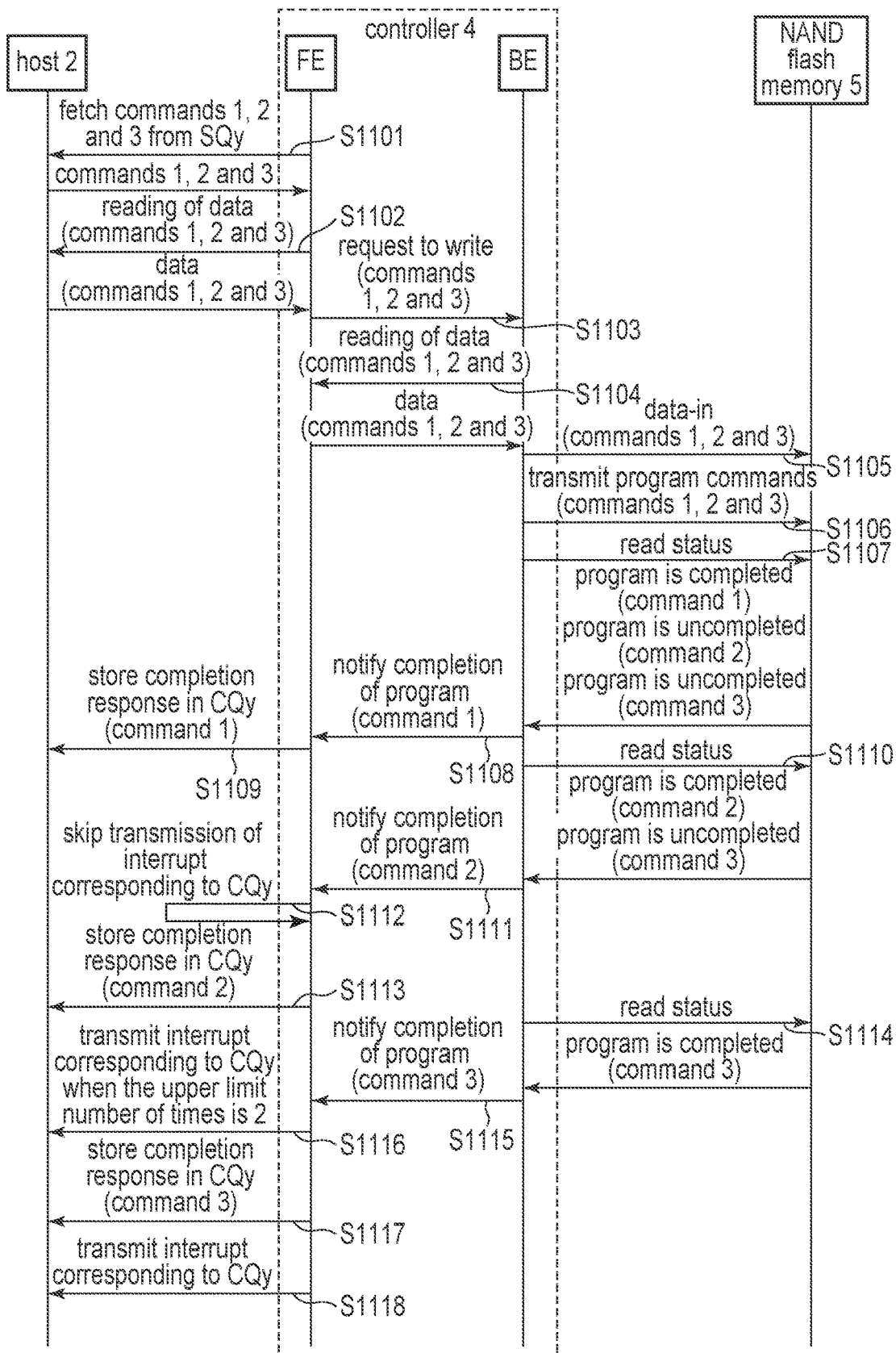
F I G. 11

MEMORY SYSTEM CONNECTABLE TO A HOST AND INCLUDING A NONVOLATILE MEMORY AND A CONTROLLER ELECTRICALLY CONNECTED TO THE NONVOLATILE MEMORY

CROSS-REFERENCE TO RELATED APPLICATIONS

This application is based upon and claims the benefit of priority from Japanese Patent Application No. 2021-184923, filed Nov. 12, 2021, the entire contents of which are incorporated herein by reference.

FIELD

Embodiments described herein relate generally to a technique for controlling a nonvolatile memory.

BACKGROUND

Memory systems implemented with a nonvolatile memory have recently become widespread. As such memory systems, a solid state drive (SSD) implemented with a NAND flash memory has been known.

A controller of the memory system processes an input/output (I/O) command received from a host. Upon completion of the processing of the I/O command, the controller transmits a completion response for the I/O command to the host. Then, the controller transmits an interrupt to the host to inform the host that there is a completion response to be processed.

A standard of NVM Express™ (NVME™) defines interrupt coalescing. The interrupt coalescing is a function of reducing the frequency at which interrupts are transmitted to the host by the controller, thus reducing a load of the host that needs to process the interrupts and completion responses.

However, if the number of times of transmission of completion responses per one interrupt is controlled in a static manner, I/O access performance of the host may be degraded, depending on a status of processing of the I/O commands in the controller.

Thus, it is required to implement a new interrupt control that can improve the I/O access performance of the host.

BRIEF DESCRIPTION OF THE DRAWINGS

FIG. 5 is a sequence diagram illustrating a procedure of a command process that coalesces interrupts for two read commands, which is executed in the memory system according to the embodiment.

FIG. 11 is a sequence diagram illustrating a procedure of a command process including a process of limiting the number of times that a completion response is capable of being transmitted to the host without transmitting an interrupt to the host, the command process being executed in the memory system according to the embodiment.

DETAILED DESCRIPTION

Various embodiments will be described hereinafter with reference to the accompanying drawings.

In general, according to one embodiment, a memory system is connectable to a host. The memory system comprises a nonvolatile memory and a controller. The nonvolatile memory includes a page buffer and a memory cell array. The controller is electrically connected to the nonvolatile memory and is configured to execute a plurality of data write operations or data read operations respectively corresponding to a plurality of input/output (I/O) commands received from the host. Each of the plurality of data write operations includes at least a data-in operation of transferring write data from the controller to the page buffer, and a program operation of programing the write data from the page buffer into the memory cell array. Each of the plurality of data read operations includes at least a sense operation of reading read data from the memory cell array to the page buffer, and a data-out operation of transferring the read data from the page buffer to the controller. In response to detecting completion of a first data write operation or a first data read operation corresponding to a first I/O command among the plurality of I/O commands, the controller transmits a first completion response indicating completion of the first I/O command to the host.

When detecting completion of a second program operation or a second sense operation corresponding to a second I/O command subsequent to the first I/O command in a first period after the first completion response is transmitted to the host and transmission of a first interrupt to the host is started, the first interruption indicating at least that there is the first completion response to be processed, the controller waits for completion of a second data write operation or a second data read operation corresponding to the second I/O command, without transmitting the first interrupt to the host, and in response to detecting the completion of the second data write operation or the second data read operation, transmits a second completion response indicating completion of the second I/O command to the host, and transmits the first interrupt to the host after the second completion response is transmitted to the host.

When not detecting the completion of the second program operation or the second sense operation in the first period, the controller transmits the first interrupt to the host, and in response to detecting the completion of the second data write operation or the second data read operation, transmits the second completion response to the host.

Figure 1:
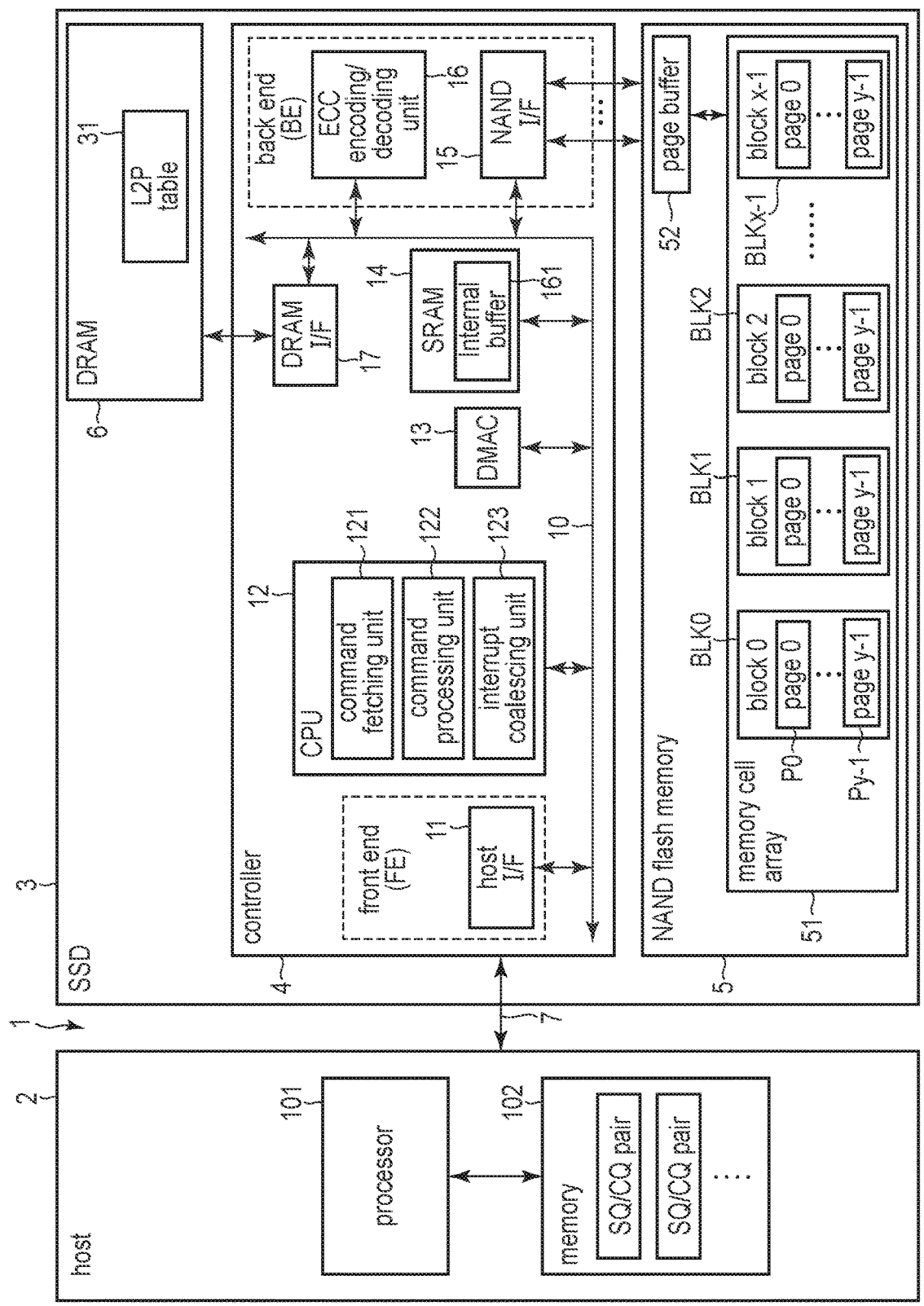
FIG. 1 is a block diagram illustrating an example of a configuration of an information processing system that includes a memory system according to an embodiment.

It is assumed that a memory system according to the embodiment is implemented as an SSD. FIG. 1 is a block diagram illustrating an example of a configuration of an information processing system 1 that includes the memory system according to an embodiment. The information processing system 1 includes a host (host device) 2 and an SSD 3.

The host 2 is an information processing apparatus (computing device) that accesses the SSD 3. The host 2 is, for example, a personal computer, a server computer, or a mobile device.

The SSD 3 is a storage device connectable to the host 2. The SSD 3 and the host 2 communicate with each other via a bus 7.

The bus 7 is a communication path that connects the host 2 and the SSD 3. The bus 7 is, for example, a PCI Express™ (PCIe™) bus. The PCIe bus is a full-duplex communication path. The full-duplex communication path includes both a transmission path for transmitting data from the host 2 to the SSD 3 and a transmission path for transmitting data from the SSD 3 to the host 2.

As a standard of a logical interface for connecting the host 2 and the SSD 3, for example, the NVMe standard may be used. In the interface of the NVMe standard, the communication between the host 2 and the SSD 3 is performed using a pair of queues including at least one submission queue (SQ) and a completion queue (CQ) associated with the at least one submission queue (SQ). This queue pair is referred to as a submission queue/completion queue pair (SQ/CQ pair).

The submission queue (SQ) is a queue used to issue a command to the SSD 3. The completion queue (CQ) is a queue used to receive a completion response from the SSD 3. The completion response indicates completion of a command. The completion response includes information indicating a status of the completed command. The completion response is referred to also as command completion or command completion notification.

A configuration of the host 2 will then be described. The host 2 includes a processor 101 and a memory 102.

The processor 101 is, for example, a central processing unit (CPU). The processor 101 executes software (host software) that is loaded from the SSD 3 or another storage device connected to the host 2 into the memory 102. The host software includes an operating system, a file system, and an application program.

The memory 102 is, for example, a dynamic random-access memory (DRAM). A part of the memory region of the memory 102 is used to store at least one SQ/CQ pair.

In communication between the host 2 and the SSD 3, a command is issued from the host 2 to the SSD 3 and a completion response is transmitted from the SSD 3 to the host 2, using an SQ/CQ pair. A command, write data, read data, and a completion response are transferred between the host 2 and the SSD 3 through the bus 7.

An internal configuration of the SSD 3 will be described. The SSD 3 includes a controller 4 and a nonvolatile memory 5. The nonvolatile memory 5 is, for example, a NAND flash memory. Hereinafter, the nonvolatile memory 5 is referred to as a NAND flash memory 5. The SSD 3 may further include a random-access memory, e.g., a dynamic random-access memory (DRAM) 6.

The controller 4 is a memory controller that controls the NAND flash memory 5. The controller 4 may be a control circuit such as a system-on-a-chip (SoC). Respective functions of the controller 4 may be implemented by dedicated hardware, a processor that executes programs, or a combination of the dedicated hardware and processor. The controller 4 is electrically connected to the NAND flash memory 5. As a physical interface that connects the controller 4 and the NAND flash memory 5, for example, a Toggle NAND flash interface or an open NAND flash interface (ONFI) is used.

The controller 4 performs a data read operation of reading data from the NAND flash memory 5 or a data write operation for writing data to the NAND flash memory 5, by processing an I/O command received from the host 2. The I/O command is, for example, a read command or a write command. The read command is a command for reading data from the NAND flash memory 5. The write command is a command for writing data to the NAND flash memory 5.

The NAND flash memory 5 is a nonvolatile memory. The NAND flash memory 5 includes a memory cell array 51 and a page buffer 52. The memory cell array 51 includes a plurality of memory cells arranged into a matrix. The NAND flash memory 5 may be a flash memory of a two-dimensional structure or a flash memory of a three-dimensional structure.

The memory cell array 51 of the NAND flash memory 5 includes a plurality of blocks BLK0 to BLKx-1. Each of the blocks BLK0 to BLKx-1 includes a plurality of pages (pages P0 to Py-1 as illustrated in FIG. 1). Each of the pages includes a plurality of memory cells connected to the same word line. Each of the blocks BLK0 to BLKx-1 is a unit for a data erase operation for erasing data. Each of the pages P0 to Py-1 is a unit for a program operation and a sense operation, which will be described later.

The page buffer 52 includes, for example, a static RAM (SRAM). The page buffer 52 temporarily stores data which is transferred between the controller 4 and the NAND flash memory 5.

During the data write operation, data received from the controller 4 is temporarily stored in the page buffer 52 and then the data is programed (written) into the memory cell array 51. An operation of temporarily storing data received from the controller 4 in the page buffer 52 is referred to as a data-in operation. An operation of programming (writing)

data temporarily stored in the page buffer 52 into the memory cell array 51 is referred to as a program operation.

During the data read operation, data read from the memory cell array 51 is temporarily stored in the page buffer 52 and then the data is output to the controller 4. An operation of temporarily storing data read from the memory cell array 51 in the page buffer 52 is referred to as a sense operation. An operation of outputting data temporarily stored in the page buffer 52 to the controller 4 is referred to as a data-out operation.

Each of the data-in operation and the data-out operation is an operation of transferring data between the controller 4 and the NAND flash memory 5. Each of the program operation and the sense operation is an operation with data transfer within the NAND flash memory 5 without data transfer between the controller 4 and the NAND flash memory 5. Thus, each I/O operation (data write operation or data read operation) executed on the NAND flash memory 5 includes at least (i) an operation of transferring data between the controller 4 and the NAND flash memory 5 and (ii) an operation with data transfer within the NAND flash memory 5 without data transfer between the controller 4 and the NAND flash memory 5.

The DRAM 6 is a volatile memory. A part of the memory region of the DRAM 6 is used to store, for example, a logical-to-physical address translation table (L2P table) 31. The L2P table 31 stores mapping information. The mapping information is information indicating mapping between each of logical addresses and each of physical addresses of the NAND flash memory 5.

An internal configuration of the controller 4 will be described. The controller 4 includes a host interface (host I/F) 11, a central processing unit (CPU) 12, a direct memory access controller (DMAC) 13, a static RAM (SRAM) 14, a NAND interface (NAND I/F) 15, an ECC encoding/decoding unit 16, and a DRAM interface (DRAM I/F) 17. The host interface 11, the CPU 12, the DMAC 13, the SRAM 14, the NAND interface 15, the ECC encoding/decoding unit 16, and the DRAM interface 17 are interconnected via a bus 10.

Among components of the controller 4, one or more components that control communication with the host 2 is referred to as a front end (FE). The front end (FE) includes the host interface 11.

Among the components of the controller 4, one or more components that control communication with the NAND flash memory 5 is referred to as a back end (BE). The back end (BE) includes the NAND interface 15 and the ECC encoding/decoding unit 16.

The host interface 11 is a host interface circuit that executes communication with the host 2. The host interface 11 is, for example, a PCIe controller. Alternatively, when the SSD 3 is configured to incorporate a network interface controller, the host interface 11 may be implemented as a part of the network interface controller.

The host interface 11 includes an arbitration mechanism. This arbitration mechanism is a mechanism of selecting, from a plurality of submission queues that exist on the memory 102 of the host 2, a submission queue from which a command is to be fetched. The arbitration mechanism is, for example, a round robin arbitration mechanism or a weighted round robin arbitration mechanism.

The host interface 11 manages a submission queue tail pointer (SQTP) and a submission queue head pointer (SQHP) for each of submission queues (SQs). The host interface 11 also manages a completion queue tail pointer (CQTP) and a completion queue head pointer (CQHP) for each of completion queues (CQs).

The CPU 12 is a processor. The CPU 12 controls the host interface 11, the DMAC 13, the SRAM 14, the NAND interface 15, the ECC encoding/decoding unit 16, and the DRAM interface 17. The CPU 12 loads a control program (firmware) stored in the NAND flash memory 5 or a ROM (not illustrated), into the SRAM 14, and performs various processes by executing the firmware. The firmware may be loaded into the DRAM 6.

The CPU 12 performs management of data stored in the NAND flash memory 5 and management of blocks included in the NAND flash memory 5, as a flash translation layer (FTL). Management of data includes management of the mapping information indicating correspondence between each of logical addresses and each of physical addresses. A logical address is an address used by the host 2 to access the SSD 3. The logical address is, for example, a logical block address (LBA). A physical address is an address representing a physical storage location included in the NAND flash memory 5. The CPU 12 manages mapping between each of the logical address and each of the physical address, using the L2P table 31. Management of blocks included in the NAND flash memory 5 includes management of defective blocks (bad blocks) included in the NAND flash memory 5, wear leveling, and garbage collection.

The DMAC 13 is a circuit that executes a direct memory access. The DMAC 13 executes data transfer between the memory 102 of the host 2 and the SRAM 14 or the DRAM 6.

The SRAM 14 is a volatile memory. A part of the memory region of the SRAM 14 is used, for example, as an internal buffer 161. The internal buffer 161 is a memory region in which data to be transferred between the host 2 and the controller 4 is stored temporarily. Alternatively, a part of the memory region of the DRAM 6 may be used as the internal buffer 161.

The NAND interface 15 is a circuit that controls the NAND flash memory 5. When the NAND flash memory 5 includes a plurality of NAND flash memory dies, the NAND interface 15 may be connected to these NAND flash memory dies via a plurality of channels.

When data is written to the NAND flash memory 5, the ECC encoding/decoding unit 16 encodes the data to be written, thereby adding an error correction code (ECC) as a redundant code to the data. When data is read from the NAND flash memory 5, the ECC encoding/decoding unit 16 performs an ECC decoding process for correcting an error of the read data using the ECC added to the read data.

The ECC encoding/decoding unit 16 can execute multiple levels of decoding processes which are different in error correction capability from each other. For example, the multiple levels of decoding processes may include (i) a first level decoding process that uses a certain error correction algorithm, (ii) a second level decoding process that uses another error correction algorithm and that has an error correction capability higher than that of the first level decoding process, and (iii) a third level decoding process that uses still another error correction algorithm and that has an error correction capability higher than that of the second level decoding process. The first level decoding process is executed first on read data. When an error of the read data cannot be corrected by the first level decoding process, the second level decoding process is then executed. When the error of the read data cannot be corrected by the second level decoding process, the third level decoding process is then executed.

The DRAM interface 17 is a circuit that controls the DRAM 6.

A functional configuration of the CPU 12 will then be described. The CPU 12 includes a command fetching unit 121, a command processing unit 122, and an interrupt coalescing unit 123. A part or all of each of the command fetching unit 121, the command processing unit 122, and the interrupt coalescing unit 123 may be implemented by dedicated hardware in the controller 4. For example, the command fetching unit 121 may be implemented in the host interface 11. Likewise, each of the command processing unit 122 and the interrupt coalescing unit 123 may also be implemented in the host interface 11.

The command fetching unit 121 fetches I/O commands from a submission queue (SQ) of the host 2, via the host interface 11. The command fetching unit 121 allows the controller 4 to receive a plurality of I/O commands from the host 2.

The command processing unit 122 instructs the NAND flash memory 5 to execute a plurality of data write operations or data read operations respectively corresponding to a plurality of I/O commands received from the host 2. An instruction to the NAND flash memory 5 to perform the data write operation or the data read operation is transmitted to the NAND flash memory 5 via the NAND interface 15.

The command processing unit 122 transmits a completion response indicating completion of an I/O command to the host 2 via the host interface 11. In this case, the command processing unit 122 stores the completion response in a completion queue (CQ) associated with a submission queue (SQ) from which the I/O command is fetched.

The interrupt coalescing unit 123 executes control for coalescing several interrupts each indicating that there is a completion response to be processed in the completion queue (CQ). In cooperation with the NAND interface 15, the interrupt coalescing unit 123 manages a status of progress of each of the plurality of data write operations or data read operations executed in the NAND flash memory 5. Based on the status of progress of each of the plurality of data write operations or data read operations, the interrupt coalescing unit 123 adaptively controls the interrupt coalescing.

Figure 2:
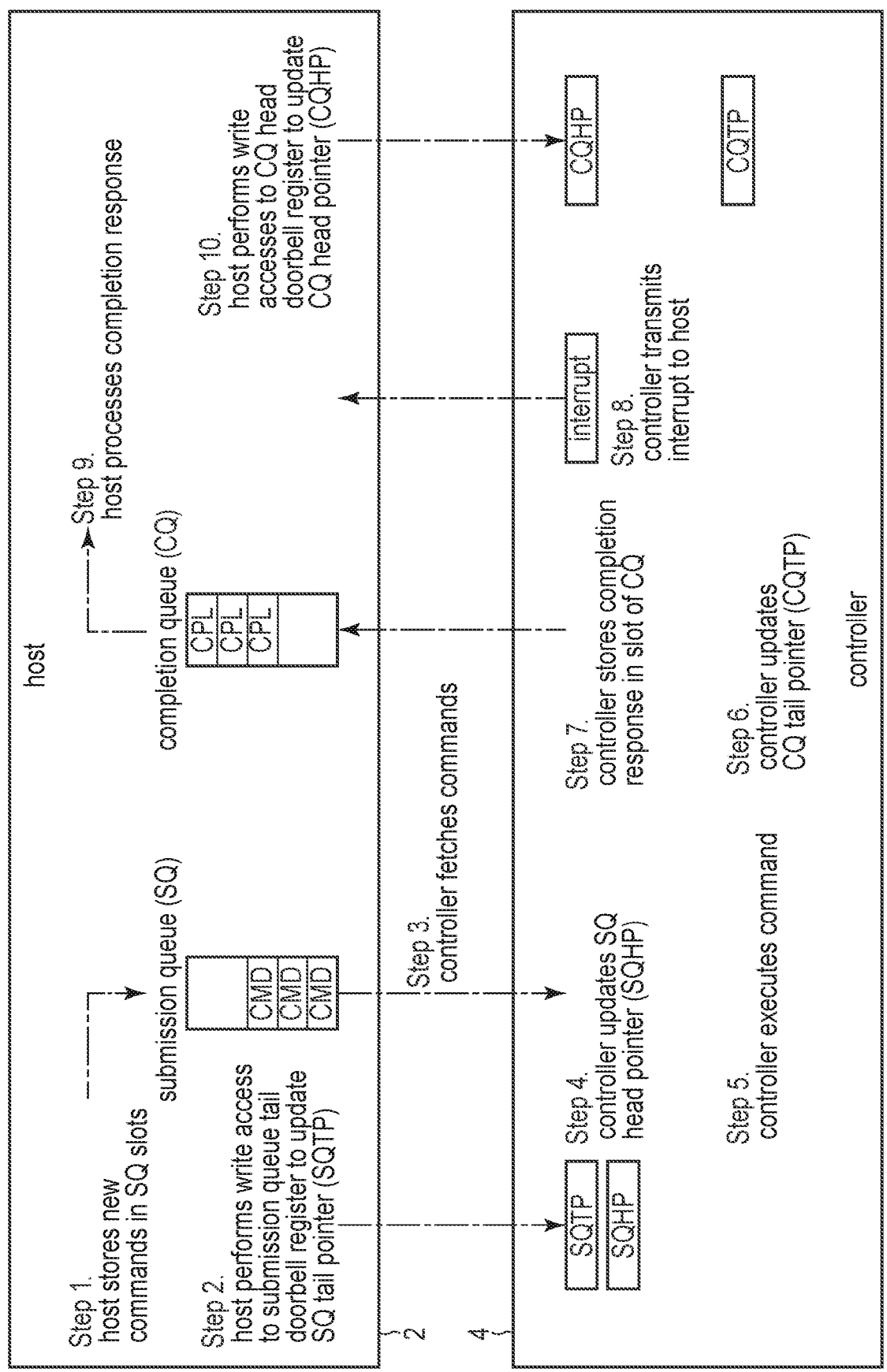
FIG. 2 is a diagram illustrating a procedure of a command process executed in the memory system according to the embodiment.

A procedure of processing the I/O command will be described. FIG. 2 is a diagram illustrating a procedure of a command process executed in the memory system according to the embodiment. FIG. 2 illustrates a procedure after a command is issued by the host 2 until a command completion corresponding to this command is processed by the host 2.

Step 1: The host 2 stores one or more new commands to be transmitted to the SSD 3, in one or more free SQ slots of a submission queue (SQ). These one or more new commands are stored in one or more free SQ slots starting from a slot indicated by the current value of a submission queue tail pointer (SQTP). The new commands stored in the submission queue (SQ) may be write commands, read commands, or other commands. In FIG. 2, each of the commands stored in the submission queue (SQ) is denoted as "CMD".

Step 2: To notify the controller 4 of the SSD 3 that the new one or more commands are stored in the submission queue (SQ), the host 2 performs write access to a submission queue tail doorbell register in the SSD 3, the register corresponding to the submission queue (SQ), and updates the value of the submission queue tail pointer (SQTP) corresponding to the submission queue (SQ). The value of the submission queue tail pointer (SQTP) is incremented by the number of new commands stored in the submission queue (SQ). Such updating of the submission queue tail pointer (SQTP) serves as a trigger that causes the controller 4 to start processing each of commands stored in the submission queue (SQ).

Step 3: Based on a difference between a new value of the submission queue tail pointer (SQTP) and a value of the submission queue head pointer (SQHP), the controller 4 is able to recognize the number of new commands stored in the submission queue (SQ). The controller 4 fetches any given number of commands, the any given number being one or more, from the submission queue (SQ). Each fetched command is temporarily stored in the internal buffer 161 in the controller 4.

Step 4: The controller 4 updates the value of the submission queue head pointer (SQHP) corresponding to the submission queue (SQ) such that the value of the submission queue head pointer (SQHP) is incremented by the number of the commands fetched at step 3.

Step 5: The controller 4 executes each of the fetched commands. An order in which these commands are executed is not limited to a specific order, and the commands may be executed in an order different from an order in which the commands are fetched. In a process of executing each of the commands, the controller 4 executes data transfer from the memory 102 of the host 2 to the internal buffer 161 of the controller 4 or data transfer from the internal buffer 161 to the memory 102 of the host 2 as needed.

Step 6: When execution of a certain command is completed, the controller 4 first updates a completion queue tail pointer (CQTP) corresponding to a completion queue (CQ) associated with the submission queue (SQ) from which the completed command is fetched, and increments the value of the completion queue tail pointer (CQTP) by 1.

Step 7: The controller 4 stores a new completion response indicating the status of this completed command, in the next free CQ slot in this completion queue (CQ). In FIG. 2, each of completion responses stored in the completion queue (CQ) is denoted as "CPL".

Step 8: The controller 4 transmits an interrupt to the host 2. In this case, the controller 4 transmits an interrupt including an interrupt vector corresponding to the completion queue (CQ) in which the completion response is stored at step 7, to the host 2, thereby informing the host 2 of the new completion response having been stored in the completion queue (CQ).

Step 9: The host 2 obtains the completion response from a CQ slot indicated by the current value of a completion queue head pointer (CQHP), and processes the obtained completion response.

Step 10: The host 2 performs write accesses to a completion queue head doorbell register in the SSD 3, the register corresponding to the completion queue (CQ), and updates the value of the completion queue head pointer (CQHP). The value of the completion queue head pointer (CQHP) is incremented by the number of completion responses processed at step 9.

Figure 3:
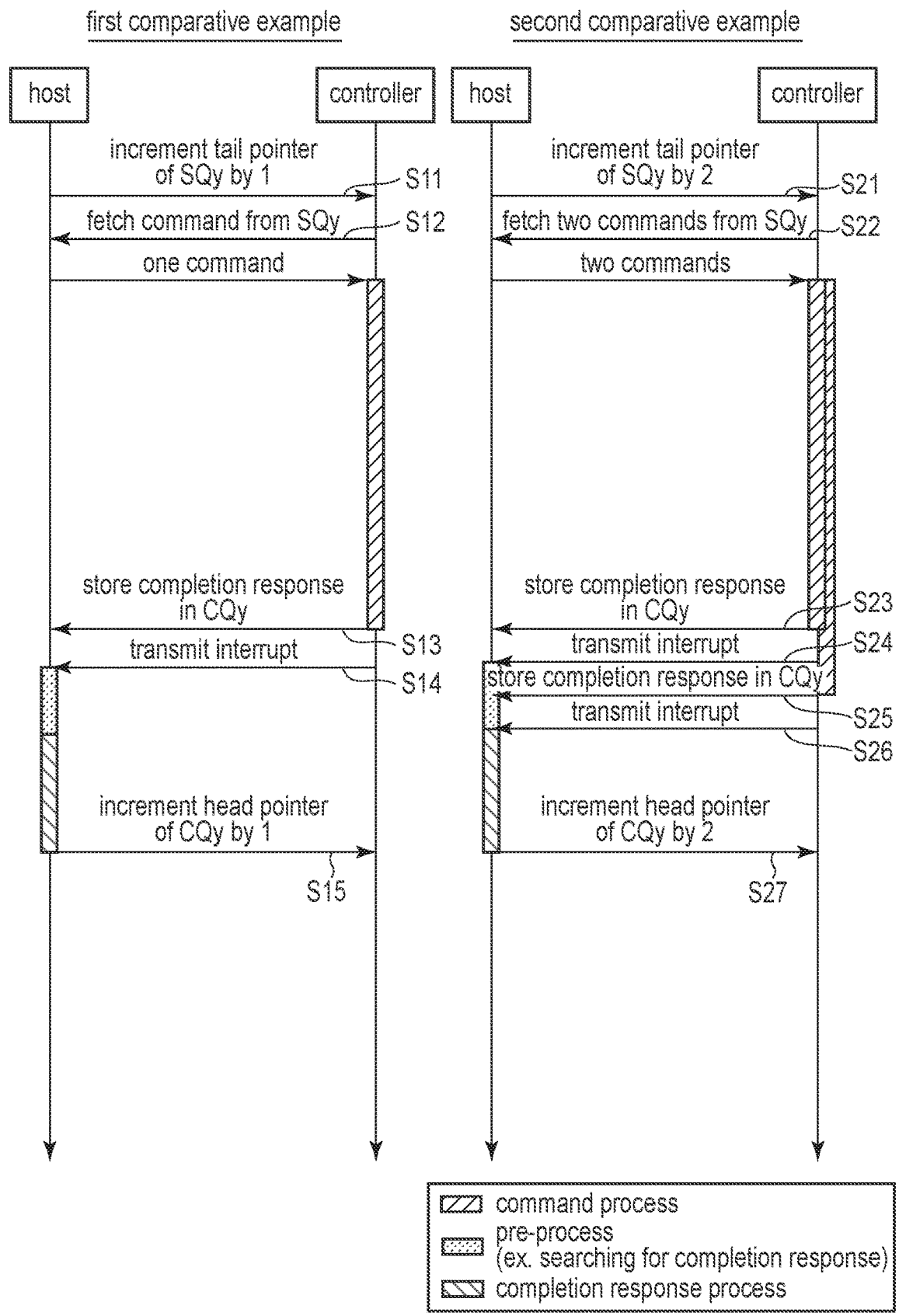
FIG. 3 is a sequence diagram illustrating an operation of processing one command and an operation of processing two commands, which are executed in comparative examples.

A sequence of a command process for processing a command will then be described. Before describing a sequence of the command process according to this embodiment, a sequence of the command process according to comparative examples will first be described. FIG. 3 is a sequence diagram illustrating an operation of processing one command, which is executed in a first comparative example, and an operation of processing two commands, which is executed in a second comparative example.

In the first comparative example, when the host stores one command in a submission queue (SQy), the host increments the value of the submission queue tail pointer (SQTP) corresponding to the submission queue (SQy) by 1 (step S11).

Based on a difference (=1) between the value of the SQHP and the current value of the SQTP, the controller recognizes that one command has been stored in the submission queue (SQy). The controller fetches the one command from the submission queue (SQy) (step S12).

The controller starts a command process corresponding to the fetched command.

When the command process of the fetched command is completed, the controller transmits, to the host, a completion response indicating completion of the fetched command to store the completion response in a completion queue (CQy) of the host (step S13).

The controller then transmits an interrupt including an interrupt vector associated with the completion queue (CQy), to the host (step S14).

In response to reception of the interrupt, the host starts a pre-process. In the pre-process, the host acquires the interrupt vector included in the received interrupt. Based on the acquired interrupt vector, the host determines a completion queue to be processed. One or more completion queues (CQy) associated with the acquired interrupt vector are determined to be the completion queues to be processed. The host searches for all unprocessed completion responses from the determined one or more completion queues (CQy). The host retrieves unprocessed completion responses from the determined one or more completion queues (CQy). When the host retrieves the searched completion responses, the host starts processing of the retrieved completion responses.

The host increments the completion queue head pointer (CQHP) corresponding to the completion queue (CQy) in which the completion response processed was stored, by the number of completion responses processed, which is 1 in this case (step S15).

Command process executed in the second comparative example will then be described. In the second comparative example, two commands are processed in parallel by the controller.

When the host stores two commands in the submission queue (SQy), the host increments the value of the submission queue tail pointer (SQTP) corresponding to the submission queue (SQy) by 2 (step S21).

Based on a difference (=2) between the value of the SQHP and the current value of the SQTP, the controller recognizes that two commands have been stored in the submission queue (SQy). The controller fetches the two commands from the submission queue (SQy) (step S22).

The controller starts two command processes corresponding to the fetched two commands. The controller executes the two command processes corresponding to the two commands in parallel.

When one of the two command processes is completed, the controller transmits, to the host, a completion response indicating completion of the one command to store the completion response in the completion queue (CQy) (step S23).

The controller then transmits an interrupt including an interrupt vector associated with the completion queue (CQy), to the host (step S24).

In response to reception of the interrupt, the host starts a pre-process.

It is assumed in this case that during the pre-process, the command process of the other command of the two commands is completed. When the command process of the other command is completed, the controller transmits, to the host, a completion response indicating completion of the other command to store the completion response in the completion queue (CQy) (step S25).

The controller then transmits an interrupt including an interrupt vector corresponding to the completion queue (CQy), to the host (step S26).

It is assumed in this case that a difference in point of time of completion between the two command processes is relatively small. In such a case, the host is able to acquire two completion responses in one pre-process. The host is thus allowed to process the acquired two completion responses collectively.

When processing of the two completion responses is completed, the host increments the value of the completion queue head pointer (CQHP) corresponding to the completion queue (CQy), by the number of completion responses processed (=2) (step S27).

Figure 4:
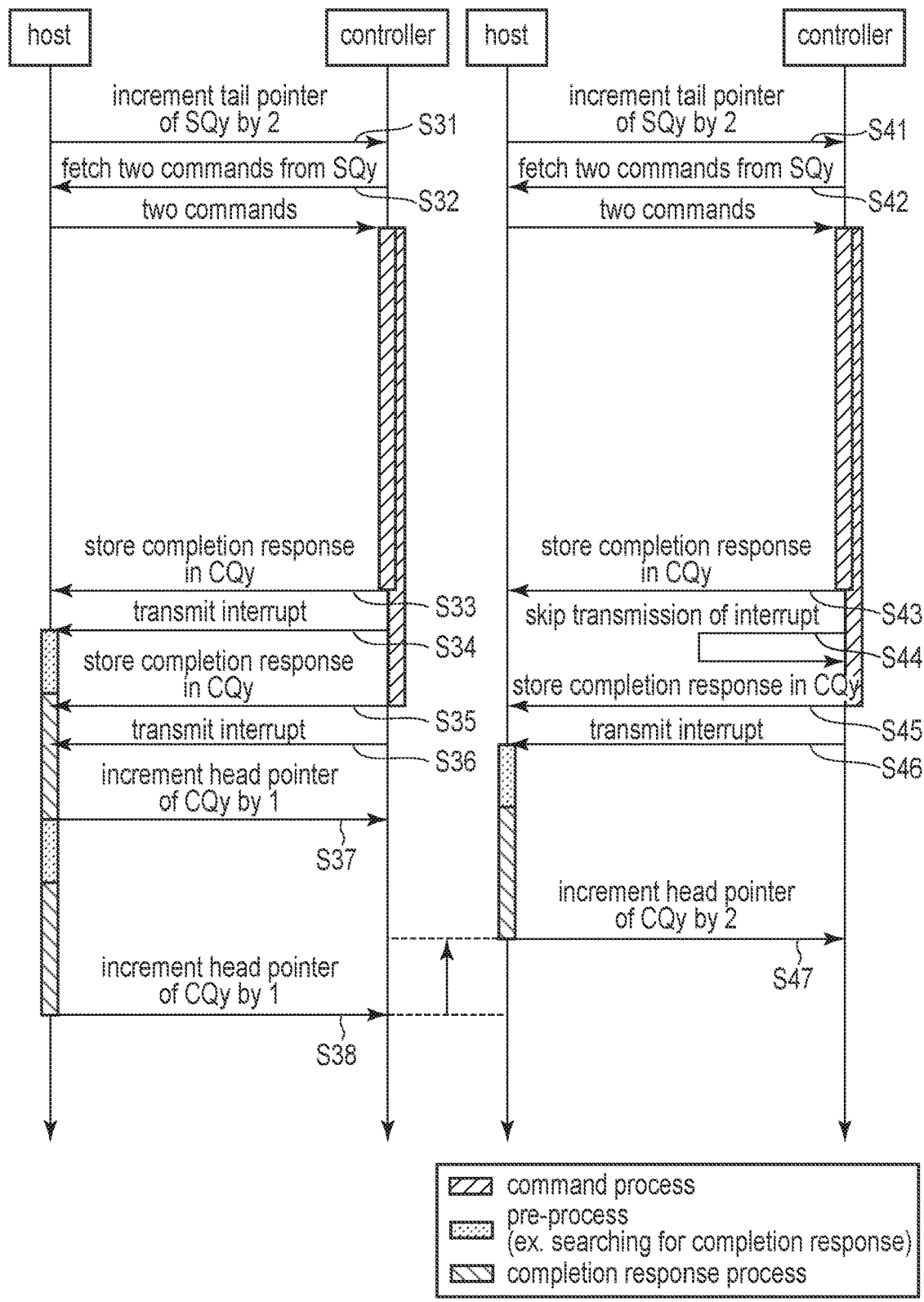
FIG. 4 is a sequence diagram illustrating an operation of processing two commands and an operation of coalescing interrupts for the two commands, which are executed in comparative examples.

FIG. 4 is a sequence diagram illustrating an operation of processing two commands, which is executed in a third comparative example, and an operation of processing two commands, which is executed in a fourth comparative example.

Operations executed at steps S31 to S34 in the third comparative example are the same as operations executed at steps S21 to S24 in the second comparative example of FIG. 3.

The third comparative example is an assumed case where a difference in point of time of completion between two command processes is larger than that in the second comparative example of FIG. 3.

Specifically, in the third comparative example, it is assumed that after a pre-process of searching for a completion response corresponding to one command is completed, a command process of the other command is completed. When the command process of the other command is completed, the controller transmits, to the host, a completion response indicating completion of the other command to store the completion response in the completion queue (CQy) (step S35).

The controller then transmits an interrupt including an interrupt vector corresponding to the completion queue (CQy), to the host (step S36). At this point, the host has already executed a completion response process of processing the completion response stored at step S33.

When the completion response process is completed, the host increments the value of the completion queue head pointer (CQHP) corresponding to the completion queue (CQy), by the number of completion responses processed by the completion response process (=1) (step S37).

The host then executes a pre-process and a completion response process again. When this completion response process is completed, the host increments the value of the completion queue head pointer (CQHP) corresponding to the completion queue (CQy), by the number of completion responses processed by the completion response process (=1) (step S38).

In the third comparative example, because the difference in point of time of completion between two command processes is larger than that in the second comparative example of FIG. 3, two completion responses corresponding to two commands cannot be processed collectively. The host, therefore, needs to execute the pre-process and the completion response process two times.

The fourth comparative example is an example in which two interrupts are coalesced. Operations executed at steps S41 to S43 in the fourth comparative example are the same as operations executed at steps S31 to S33 in the third comparative example.

After transmitting a completion response indicating completion of one command to the host to store the completion response in the completion queue (CQy), the controller skips transmission of an interrupt including an interrupt vector associated with the completion queue (CQy) (step S44).

When the command process of the other command is completed, the controller transmits, to the host, a completion response indicating completion of the other command to store the completion response in the completion queue (CQy) (step S45).

The controller then transmits an interrupt including an interrupt vector associated with the completion queue (CQy), to the host (step S46).

In response to reception of the interrupt, the host starts a pre-process. The host searches for unprocessed completion responses stored in one or more completion queues corresponding to the interrupt vector included in the received interrupt. The host thus acquires the completion responses stored in the completion queue (CQy) at steps S43 and S45.

When the pre-process is completed, the host starts a completion response process of processing the acquired two completion responses. The host is capable of processing the two completion responses collectively.

When the completion response process is completed, the host increments the value of the completion queue head pointer (CQHP) corresponding to the completion queue (CQy), by the number of completion responses processed (=2).

In this manner, by coalescing two interrupts, the controller allows the host to process two completion responses collectively. From the viewpoint of the I/O access performance of the host, the fourth comparative example is advantageous over the third comparative example.

However, in execution of the interrupt coalescing according to the fourth comparative example, the controller transmits a given number of completion responses and then transmits an interrupt to the host only once, or, the controller transmits a completion response and after an elapse of a given time, transmits an interrupt to the host only once.

Because of this control, in the most unfavorable case of the fourth comparative example, processing of the completion response corresponding to the first command is delayed for a period equivalent to a difference in point of time of completion between two command processes corresponding to the two commands. When the difference in point of time of completion is very large, therefore, a latency from a point of time of issue of the first command by the host to a point of time of execution of the completion response process for the first command increases, which results in reduced I/O access performance of the host. When a point of time of issue of the next command by the host is delayed by this increased latency, the I/O access performance of the host is further reduced.

To prevent such cases, according to this embodiment, the controller 4 adaptively controls interrupt coalescing in the following manner, based on a status of progress of each of a plurality of data write operations or data read operations executed in the NAND flash memory 5.

The controller 4 instructs the NAND flash memory 5 to execute a plurality of data write operations or data read operations respectively corresponding to a plurality of I/O commands received from the host 2. The controller 4 manages the status of progress of each of the data write operations or data read operations executed in the NAND flash memory 5. The status of progress of each of the data write operations or data read operations executed in the NAND flash memory 5 is managed by, for example, transmitting a read status command to the NAND flash memory 5. The read status command is a command for confirming whether the NAND flash memory 5 is in a state of being executing a program operation or a sense operation (busy state) or in a state of having completed the program operation or the sense operation (ready state).

In response to detecting completion of a first data write operation or first data read operation corresponding to a first I/O command among the I/O commands, the controller 4 transmits a first completion response indicating completion of the first I/O command, to the host 2. In response to detecting completion of the program operation, the controller 4 considers that the data write operation is completed. In response to transmitting the read data to the host 2 after a data-out operation is completed, the controller 4 considers that the data read operation is completed.

For example, in a case where the operation corresponding to the first I/O command is the data read operation, when the sense operation executed by the NAND flash memory 5 is completed, read data read from the memory cell array 51 of the NAND flash memory 5 has been stored in the page buffer 52 of the NAND flash memory 5. The controller 4 thus executes the data-out operation of acquiring the read data from the page buffer 52 of the NAND flash memory 5. Subsequently, the controller 4 transmits the acquired read data to the host 2 and then transmits the first completion response to the host 2.

In a case where the operation corresponding to the first I/O command is the data write operation, when the data-in operation of transferring write data to the NAND flash memory 5 is completed, the write data has been stored in the page buffer 52 of the NAND flash memory 5. When the program operation executed by the NAND flash memory 5 is completed, the write data has been programed (written) into the memory cell array 51 of the NAND flash memory 5. After detecting completion of the program operation, the controller 4 transmits the first completion response to the host 2.

Within a period of time after completion of the data write operation or data read operation corresponding to the first I/O command is detected and before an interrupt indicating that there is a completion response to be processed is transmitted to the host 2, if completion of a second program operation or second sense operation corresponding to a second I/O command subsequent to the first I/O command is detected, the controller 4 executes the interrupt coalescing. In other words, after transmitting the first completion response indicating completion of the first I/O command to the host 2, the controller 4 does not transmit the interrupt corresponding to the first completion response, that is, the interrupt indicating that there is a completion response to be processed (the first completion response), to the host 2 but waits for completion of the data write operation or data read operation corresponding to the second I/O command. Then, in response to detecting completion of the data write operation or data read operation corresponding to the second I/O command, the controller 4 transmits a second completion response indicating completion of the second I/O command, to the host 2. After transmitting the second completion response to the host 2, the controller 4 transmits an interrupt corresponding to the first completion response and second completion response, to the host 2.

A time limit may be set between transmission of the completion response and transmission of the interrupt. In this case, the controller 4 may execute the interrupt coalescing on condition that completion of the second program operation or second sense operation is detected before time elapsed since the first completion response was transmitted reaches the time limit.

This means that if completion of the second program operation or second sense operation is not detected before the time elapsed since the first completion response was transmitted reaches the time limit, the controller 4 does not execute the interrupt coalescing. In this case, therefore, after transmitting the first completion response indicating completion of the first I/O command (that is, completion of the first data write operation or first data read operation) to the host 2, the controller 4 transmits an interrupt to the host 2 in response to the time elapsed since the first completion response was transmitted reaching the time limit. Then, in response to detecting completion of the second I/O command (that is, completion of the second data write operation or second data read operation), the controller 4 transmits a second completion response indicating completion of the second I/O command, to the host 2.

In this manner, based on a difference in point of time of completion between the first data write operation or first data read operation and the second program operation or second sense operation, the controller 4 autonomously determines whether or not to coalesce interrupts.

Thereafter, within a period after completion of the second data write operation or second data read operation is detected and before transmission of an interrupt to the host 2 is started, if completion of a third program operation or third sense operation corresponding to a third I/O command subsequent to the second I/O command is detected, the controller 4 executes the interrupt coalescing again. In other words, after transmitting the second completion response indicating completion of the second I/O command to the host 2, the controller 4 does not transmit the interrupt corresponding to the second completion response, that is, the interrupt indicating that there is a completion response to be processed (the second completion response), to the host 2 but waits for completion of the data write operation or data read operation corresponding to the third I/O command. Then, in response to detecting completion of the data write operation or data read operation corresponding to the third I/O command, the controller 4 transmits a third completion response indicating completion of the third I/O command, to the host 2. After transmitting the third completion response to the host 2, the controller 4 transmits an interrupt corresponding to the second completion response and third completion response, to the host 2.

In this case, when completion of the third program operation or third sense operation is not detected before the time elapsed since the second completion response was transmitted reaches the time limit, the controller 4 does not execute the interrupt coalescing. Thus, after transmitting the second completion response indicating completion of the second I/O command (that is, completion of the second data write operation or second data read operation) to the host 2, the controller 4 transmits an interrupt to the host 2 in response to the time elapsed since the second completion response was transmitted reaching the time limit. Then, in response to detection of completion of the third I/O command (that is, completion of the third data write operation or third data read operation), the controller 4 transmits a third completion response indicating completion of the third I/O command, to the host 2.

In this manner, based on a difference in point of time of completion between the second data write operation or second data read operation and the third program operation or third sense operation, the controller 4 autonomously determines whether or not to coalesce interrupts.

It should be noted that the controller 4 may execute the interrupt coalescing on condition that completion of the third program operation or third sense operation is detected before time elapsed since the second completion response was transmitted reaches the time limit.

An example of a command process including interrupt coalescing control will be described. FIG. 5 is a sequence diagram illustrating a procedure of a command process that coalesces interrupts for two read commands, which is executed in the memory system according to the embodiment.

When the host 2 stores two read commands (command 1 and command 2) in the submission queue (SQy), the host 2 increments the value of the submission queue tail pointer (SQTP) corresponding to the submission queue (SQy) by 2. The front end (FE) of the controller 4 fetches the command 1 and the command 2 from the submission queue (SQy) (step S501).

The front end (FE) of the controller 4 requests the back end (BE) of the controller 4 to execute the data read operation corresponding to the command 1 and the data read operation corresponding to the command 2 (step S502).

The back end (BE) of the controller 4 transmits a sense command for reading read data specified by the command 1 and a sense command for reading read data specified by the command 2, to the NAND flash memory 5 (step S503). Each sense command instructs to execute a sense operation of reading read data from the memory cell array 51 of the NAND flash memory 5 to the page buffer 52 of the NAND flash memory 5. The back end (BE) instructs the NAND flash memory 5 to execute the sense operation corresponding to the command 1 and the sense operation corresponding to the command 2 accordingly.

When a NAND flash memory die in which the read data specified by the command 1 is stored and a NAND flash memory die in which the read data specified by the command 2 is stored are two different dies, the back end (BE) respectively transmits the sense commands to these two dies. When the two dies are respectively connected to different channels, the back end (BE) is able to simultaneously transmit the two sense commands to the two dies. When the two dies are connected to the same channel, the back end (BE) transmits the two sense commands to the two dies by a time-division method.

When the NAND flash memory die in which the read data specified by the command 1 is stored and the NAND flash memory die in which the read data specified by the command 2 is stored are the same die, the back end (BE) transmits the two sense commands to this die in sequence.

When the NAND flash memory 5 receives the sense command corresponding to the command 1 from the controller 4, the NAND flash memory 5 executes the sense operation of reading read data specified by the sense command from the memory cell array 51 to the page buffer 52. Time required for the sense operation is referred to as sense time (tR).

When the NAND flash memory 5 receives the sense command corresponding to the command 2 from the controller 4, the NAND flash memory 5 executes the sense operation of reading read data specified by the sense command from the memory cell array 51 to the page buffer 52.

The back end (BE) of the controller 4 transmits a read status command for confirming a status of progress of the sense operation corresponding to the command 1 and a read status command for confirming a status of progress of the sense operation corresponding to the command 2, to the NAND flash memory 5 (step S504). When the NAND flash memory die executing the sense operation corresponding to the command 1 and the NAND flash memory die executing the sense operation corresponding to the command 2 are different from each other, the read status commands are transmitted respectively to these dies. When the NAND flash memory die executing the sense operation corresponding to the command 1 and the NAND flash memory die executing the sense operation corresponding to the command 2 are the same die, the two read status commands are transmitted to this die in sequence. In this case, a single read status command may be transmitted to this die.

Based on responses to the two read status commands, the responses being received from the NAND flash memory 5, the back end (BE) determines whether the sense operation corresponding to the command 1 has been completed and determines whether the sense operation corresponding to the command 2 has been completed.

It is assumed in this case that the sense operation corresponding to the command 1 is completed (preparation of data is completed) but the sense operation corresponding to the command 2 is not completed (preparation of data is uncompleted).

The back end (BE) of the controller 4 notifies the front end (FE) of the controller 4 that preparation of the read data corresponding to the command 1 is completed (step S505). In response to receiving this notification, the front end (FE) detects that the sense operation corresponding to the command 1 is completed.

The read data specified by the command 1 has already been transferred from the memory cell array 51 of the NAND flash memory 5 to the page buffer 52 of the NAND flash memory 5. The back end (BE) of the controller 4, therefore, executes a data-out operation for acquiring the read data specified by the command 1 from the page buffer 52 of the NAND flash memory 5, thereby acquiring the read data specified by the command 1 from the page buffer 52 (step S506). At step S506, the controller 4 transmits a data-out command to the NAND flash memory 5 to instruct the NAND flash memory 5 to execute the data-out operation. The controller 4 thus acquires the read data specified by the command 1 from the page buffer 52 of the NAND flash memory 5.

Upon acquiring the read data specified by the command 1, the back end (BE) of the controller 4 transfers the read data to the front end (FE) of the controller 4 (step S507). In this case, the read data may be transferred from the back end (BE) to the front end (FE) via the internal buffer 161.

When receiving the read data specified by the command 1, the read data being transferred from the back end (BE), the front end (FE) of the controller 4 transfers the read data specified by the command 1, to the host 2 (step S508).

The front end (FE) of the controller 4 then transmits, to the host 2, a completion response indicating completion of the command 1 to store the completion response in the completion queue (CQy) associated with the submission queue (SQy) from which the command 1 has been fetched (step S509).

The back end (BE) of the controller 4 transmits again the read status command for confirming the status of progress of the sense operation corresponding to the command 2, to the NAND flash memory 5 (step S510).

Based on a response to the read status command, the response being received from the NAND flash memory 5, the back end (BE) determines whether the sense operation corresponding to the command 2 has been completed.

It is assumed in this case that the sense operation corresponding to the command 2 is completed (preparation of data is completed).

The back end (BE) of the controller 4 notifies the front end (FE) of the controller 4 that preparation of the read data corresponding to the command 2 is completed (step S511). In response to receiving this notification, the front end (FE) detects that the sense operation corresponding to the command 2 is completed.

Because the front end (FE) of the controller 4 has received the notification that preparation of the read data corresponding to the command 2 has completed before transmitting an interrupt to the host 2, the interrupt indicating that there is a completion response to be processed (completion response indicating completion of the command 1), the front end (FE) skips transmission of the interrupt, that is, transmission of the interrupt including an interrupt vector associated with the completion queue (CQy) (step S512).

In this manner, when detecting completion of the sense operation corresponding to the subsequent command 2 in a period of time after the completion response for the preceding command 1 is stored in the completion queue (CQy) and before transmission of the interrupt is started, the front end (FE) skips transmission of the interrupt indicating that there is a completion response to be processed (completion response indicating completion of the command 1).

Note that there may be a case where the submission queue from which the preceding command 1 has been fetched and the submission queue from which the subsequent command 2 has been fetched are different from each other. In this case, the completion queue in which the completion response for the command 1 is stored and the completion queue in which the completion response for the command 2 is stored may be associated with different interrupt vectors, respectively. Therefore, when detecting completion of the sense operation corresponding to the subsequent command 2 in a time period after the completion response for the preceding command 1 is stored in the completion queue (CQy) and before transmission of the interrupt is started, the front end (FE) may determine whether an interrupt vector associated with the completion queue (CQ) in which the completion response corresponding to the command 1 is stored and an interrupt vector associated with the completion queue (CQ) in which the completion response corresponding to the command 2 is to be stored are the same interrupt vector. Only when these interrupt vectors are the same interrupt vector, the front end (FE) may skip transmission of the interrupt indicating that there is a completion response to be processed (completion response indicating completion of the command 1).

The back end (BE) of the controller 4 executes a data-out operation for acquiring the read data specified by the command 2 from the page buffer 52 of the NAND flash memory 5, thereby acquiring the read data specified by the command 2 from the page buffer 52 (step S513). Specifically, at step S513, the back end (BE) causes the NAND flash memory 5 to execute the data-out operation corresponding to the command 2, thereby acquiring the read data specified by the command 2 from the page buffer 52.

Upon acquiring the read data specified by the command 2, the back end (BE) of the controller 4 transfers the read data to the front end (FE) of the controller 4 (step S514).

When receiving the read data specified by the command 2, the read data being transferred from the back end (BE), the front end (FE) of the controller 4 transfers the read data specified by the command 2, to the host 2 (step S515). This completes the data read operation corresponding to the command 2.

In this manner, when detecting completion of the sense operation corresponding to the subsequent command 2 in the period of time after the completion response for the preceding command 1 is stored in the completion queue (CQy) and before transmission of the interrupt is started, the front end (FE) does not transmit the interrupt indicating that there is a completion response to be processed (completion response indicating completion of the command 1), to the host 2 but waits for completion of the data read operation corresponding to the command 2.

When detecting completion of the data read operation corresponding to the command 2, the front end (FE) of the controller 4 transmits, to the host 2, a completion response indicating completion of the command 2 to store the completion response in the completion queue (CQy) associated with the submission queue (SQy) from which the command 2 has been fetched (step S516).

FIG. 5 illustrates a case where fetched commands are the commands 1 and 2 and no command subsequent to the command 2 is present. Therefore, after transmitting a completion response indicating completion of the command 2 to the host 2, the front end (FE) transmits an interrupt indicating that there are completion responses to be processed (a completion response indicating completion of the command 1 and a completion response indicating completion of the command 2), that is, an interrupt including the interrupt vector corresponding to the completion queue (CQy), to the host 2 (step S517).

Receiving this interrupt, the host 2 acquires all unprocessed completion responses from one or more completion queues associated with the interrupt vector included in the received interrupt, and processes each of the acquired completion responses. Hence, by one interrupt process executed by the host 2, the completion response corresponding to the command 1 and the completion response corresponding to the command 2 are processed at once.

Figure 6:
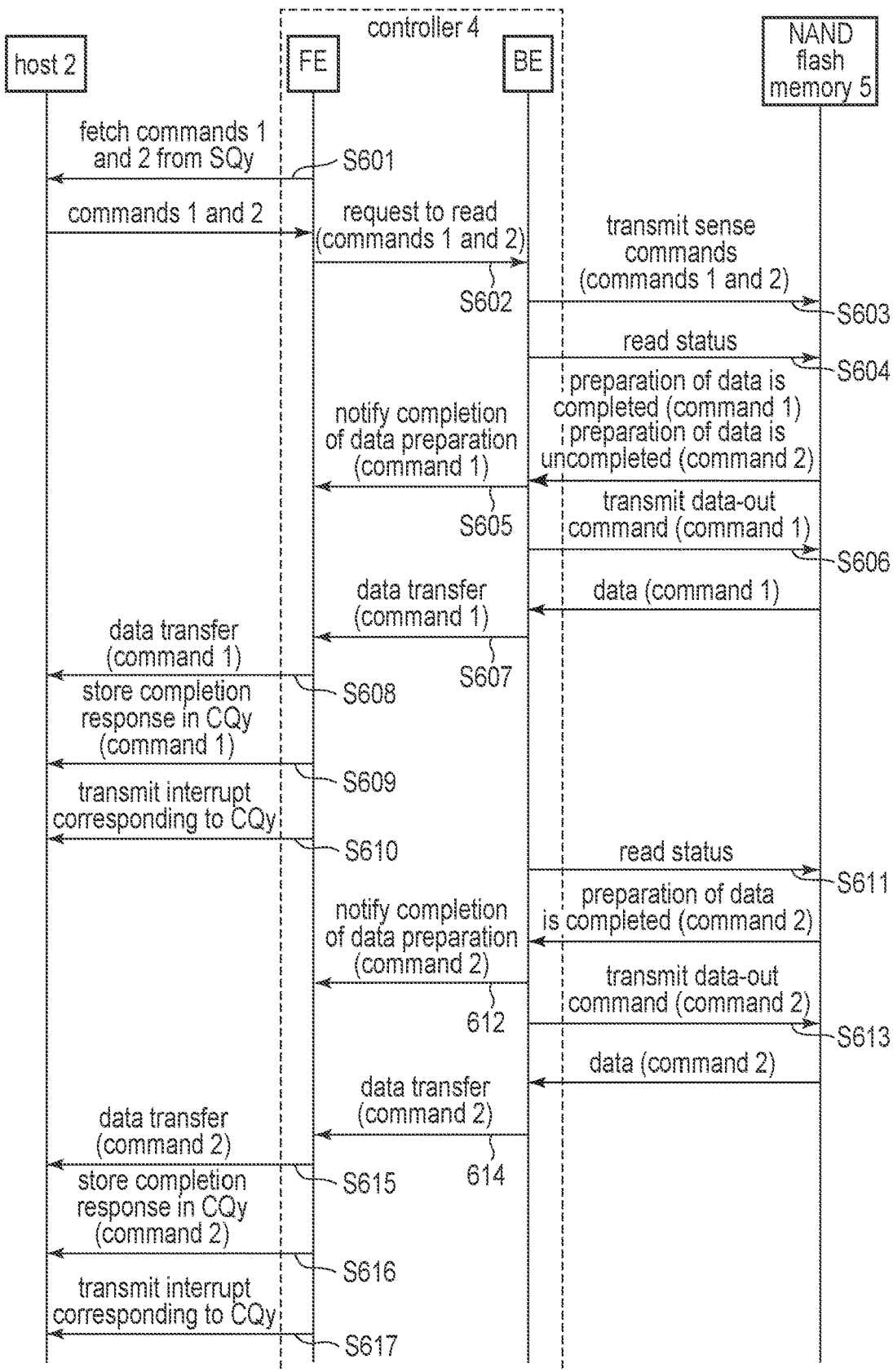
FIG. 6 is a sequence diagram illustrating a procedure of a command process that does not coalesce interrupts for two read commands, which is executed in the memory system according to the embodiment.

FIG. 6 is a sequence diagram illustrating a procedure of a command process that does not coalesce interrupts for two read commands, which is executed in the memory system according to the embodiment.

Processes executed at steps S601 to S609 of FIG. 6 are the same as processes executed at steps S501 to S509 of FIG. 5, and are therefore omitted in the following description.

FIG. 6 illustrates a case where a difference in point of time of completion between the command 1 and the command 2 (more specifically, a difference between a point of time of completion of the data read operation for the command 1 and a point of time of completion of the sense operation for the command 2) is large. In this case, therefore, completion of the sense operation corresponding to the subsequent command 2 is not detected in the period of time after the completion response for the preceding command 1 is stored and before transmission of the interrupt is started. In this case, the front end (FE) of the controller 4 does not coalesce interrupts.

After transmitting a completion response indicating completion of the command 1 to the host 2 at step S609, the front end (FE) transmits an interrupt indicating that there is a completion response to be processed (completion response indicating completion of the command 1), that is, an interrupt including an interrupt vector associated with the completion queue (CQy), to the host 2 (step S610).

In response to receiving the interrupt, the host 2 acquires all unprocessed completion responses from one or more completion queues associated with the interrupt vector included in the received interrupt, and processes each of the acquired completion responses. The completion response corresponding to the command 1 is thus processed by the host 2.

After executing step S607, the back end (BE) of the controller 4 executes steps S611 to S614. Processes executed at steps S611 to S614 are the same as processes executed at steps S510, S511, S513, and S514 of FIG. 5.

When receiving read data specified by the command 2, the read data being transferred from the back end (BE), the front end (FE) of the controller 4 transfers the read data specified by the command 2, to the host 2 (step S615).

The front end (FE) of the controller 4 transmits, to the host 2, a completion response indicating completion of the command 2 to store the completion response in the completion queue (CQy) associated with the submission queue (SQy) from which the command 2 has been fetched (step S616).

The front end (FE) then transmits an interrupt indicating that there is a completion response to be processed (completion response indicating completion of the command 2), that is, an interrupt including an interrupt vector associated with the completion queue (CQy), to the host 2 (step S617).

In response to receiving the interrupt, the host 2 acquires all unprocessed completion responses from one or more completion queues associated with the interrupt vector included in the received interrupt, and processes each of the acquired completion responses. The completion response corresponding to the command 2 is thus processed by the host 2.

Figure 7:
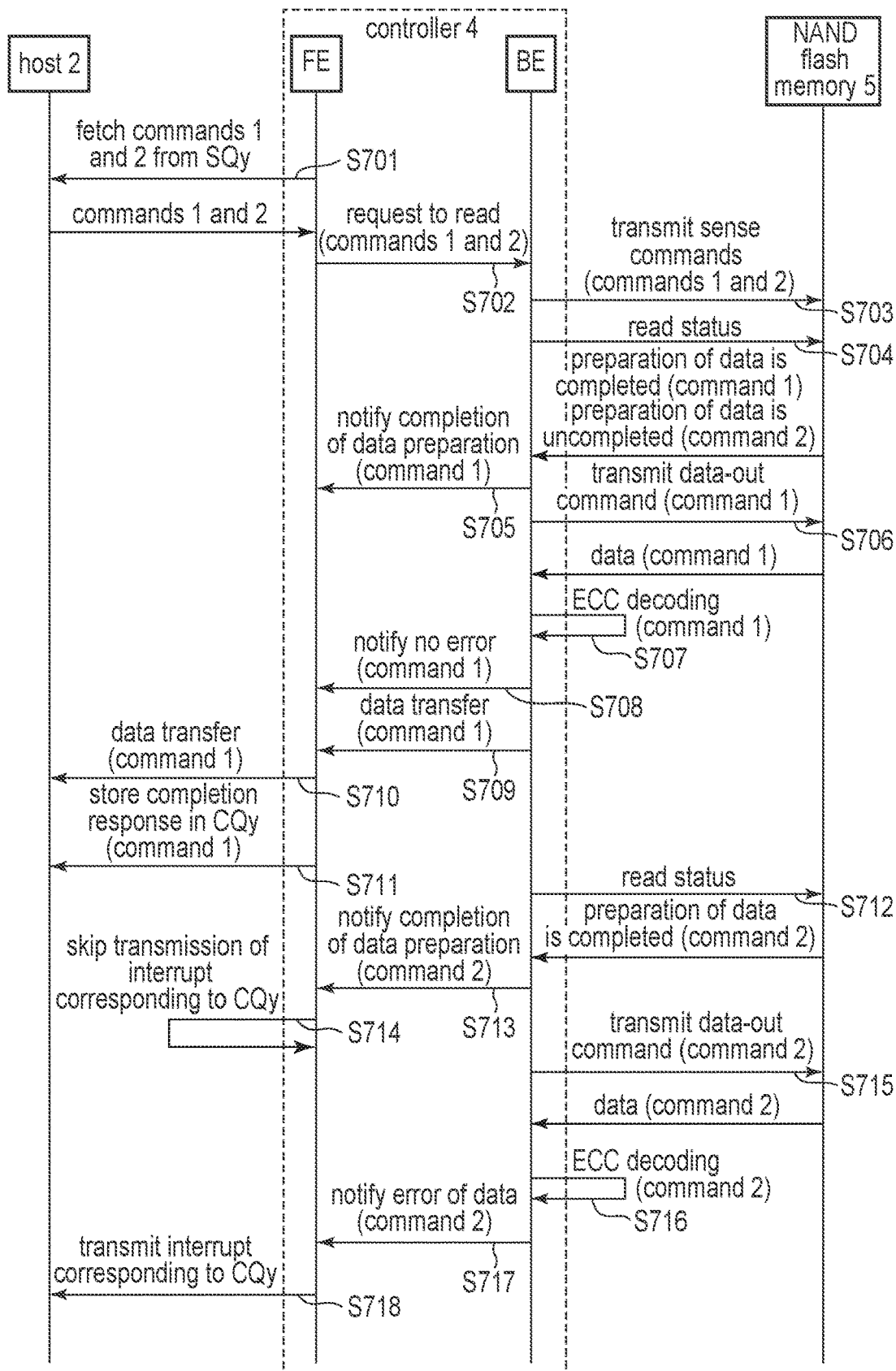
FIG. 7 is a sequence diagram illustrating a procedure of a command process that suspends interrupt coalescing, which is executed in the memory system according to the embodiment.

A process of suspending the interrupt coalescing will be described. FIG. 7 is a sequence diagram illustrating a procedure of a command process that suspends the interrupt coalescing, which is executed in the memory system according to the embodiment.

Processes executed at steps S701 to S706 of FIG. 7 are the same as processes executed at steps S501 to S506 of FIG. 5, and are therefore omitted in the following description.

When acquiring read data specified by the command 1 from the page buffer 52 of the NAND flash memory 5, the ECC encoding/decoding unit 16 in the back end (BE) of the controller 4 executes an ECC decoding process for correcting an error of the read data (step S707). When succeeding in correcting the error of the read data by a first decoding process using a predetermined specific error correction algorithm, the first decoding process being among a plurality of decoding processes (a first level decoding process, a second level decoding process, and a third level decoding process) that can be executed as the ECC decoding process, the back end (BE) notifies the front end (FE) of the ECC decoding process being successful (that is, the read data having no error) (step S708). The first decoding process may be any one of the first level decoding process, the second level decoding process, and the third level decoding process.

The back end (BE) transfers the read data to the front end (FE) of the controller 4 (step S709).

The front end (FE) transfers the read data to the host 2 (step S710).

The front end (FE) of the controller 4 then transmits, to the host 2, a completion response indicating completion of the command 1 to store the completion response in the completion queue (CQy) (step S711).

The back end (BE) transmits again a read status command for confirming the status of progress of the sense operation corresponding to the command 2, to the NAND flash memory 5 (step S712).

Based on a response to the read status command, the response being received from the NAND flash memory 5, the back end (BE) determines whether the sense operation corresponding to the command 2 has been completed.

It is assumed in this case that the sense operation corresponding to the command 2 is completed (preparation of data is completed).

The back end (BE) notifies the front end (FE) that preparation of the data corresponding to the command 2 is completed (step S713). In response to receiving this notification, the front end (FE) detects that the sense operation corresponding to the command 2 is completed.

Because the front end (FE) has received the notification that preparation of the read data corresponding to the command 2 has completed before transmitting an interrupt to the host 2, the interrupt indicating that there is a completion response to be processed (completion response indicating completion of the command 1), the front end (FE) skips transmission of the interrupt, that is, transmission of the interrupt including an interrupt vector associated with the completion queue (CQy) (step S714).

The back end (BE) executes a data-out operation for acquiring the read data specified by the command 2 from the page buffer 52 of the NAND flash memory 5, thereby acquiring the read data specified by the command 2 from the page buffer 52 (step S715)

When acquiring the read data specified by the command 2, the ECC encoding/decoding unit 16 of the back end (BE) executes an ECC decoding process for correcting an error of the read data (step S716). When failing in correcting the error of the read data by the first decoding process using the predetermined specific error correction algorithm, the back end (BE) notifies the front end (FE) that the ECC decoding process has failed (that is, the read data having the error) (step S717). The first decoding process may be any one of the first level decoding process, the second level decoding process, and the third level decoding process.

When receiving this notification, the front end (FE) transmits an interrupt indicating that there is a completion response to be processed (completion response indicating completion of the command 1), that is, an interrupt including an interrupt vector associated with the completion queue (CQy), to the host 2 (step S718), without waiting for completion of the decoding process executed by the ECC encoding/decoding unit 16, that is, without waiting for the read data having no error to be stored in the internal buffer 161, the read data being data to be transmitted to the host 2.

In response to receiving this interrupt, the host 2 acquires all unprocessed completion responses from one or more completion queues associated with the interrupt vector included in the received interrupt, and processes each of the acquired completion responses. Thus, the completion response corresponding to the command 1 is processed by the host 2.

In this manner, when detecting completion of the operation of reading the read data corresponding to the command 2 from the memory cell array 51 to the page buffer 52 in the period of time after the completion response for the preceding command 1 is stored in the completion queue (CQy) and before transmission of the interrupt is started, the controller 4 does not transmit the interrupt to the host 2 but executes the ECC decoding process for correcting the error of the read data. When the error of the read data is not corrected by the first decoding process using the specific error correction algorithm, the controller 4 transmits the interrupt to the host 2.

In this manner, although transmission of the interrupt for the command 1 is skipped once, the controller 4 is able to transmit this interrupt to the host 2 which a failure in the ECC decoding process on the data corresponding to the command 2 is detected. This prevents a delay in processing the completion response corresponding to the command 1, the delay being caused by waiting for the read data which is to be transmitted to the host 2 to be stored in the internal buffer 161.

Figure 8:
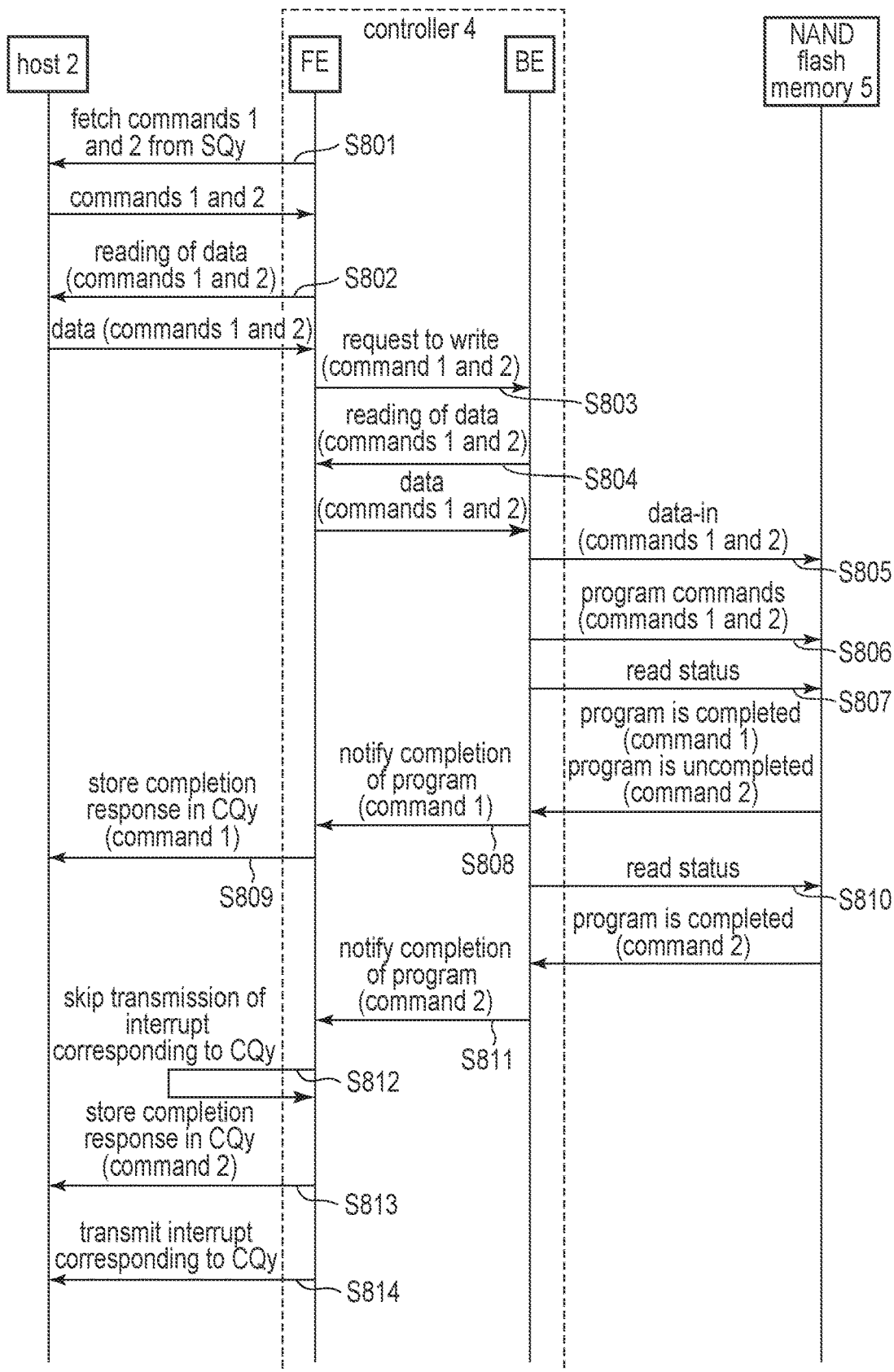
FIG. 8 is a sequence diagram illustrating a procedure of a command process that coalesces interrupts for two write commands, which is executed in the memory system according to the embodiment.

Command process for a write command will be described. FIG. 8 is a sequence diagram illustrating a procedure of a command process that coalesces interrupts for two write commands, which is executed in the memory system according to the embodiment.

When the host 2 stores two write commands (the command 1 and the command 2) in the submission queue (SQy), the host 2 increments the value of the submission queue tail pointer (SQTP) corresponding to the submission queue (SQy) by 2. The front end (FE) of the controller 4 fetches the command 1 and the command 2 from the submission queue (SQy) (step S801).

The front end (FE) reads write data corresponding to the command 1 and write data corresponding to the command 2, from the memory 102 of the host 2, and stores these pieces of write data in the internal buffer 161 (step S802).

The front end (FE) requests the back end (BE) of the controller 4 to execute the data write operation corresponding to the command 1 and the data write operation corresponding to the command 2 (step S803).

The back end (BE) reads the write data corresponding to the command 1 and the write data corresponding to the command 2, from the internal buffer 161 (step S804).

The back end (BE) then executes a data-in operation of transferring the write data corresponding to the command 1 to the page buffer 52 of the NAND flash memory 5 and a data-in operation of transferring the write data corresponding to the command 2 to the page buffer 52 of the NAND flash memory 5 (step S805).

The back end (BE) transmits a program command for programing (writing) the write data corresponding to the command 1 and a program command for programing (writing) the write data corresponding to the command 2, to the NAND flash memory 5 (step S806). Each program command is a program instruction for programing (writing) the write data stored in the page buffer 52 of the NAND flash memory 5 into the memory cell array 51. The back end (BE) instructs the NAND flash memory 5 to execute the program operation corresponding to the command 1 and execute the program operation corresponding to the command 2 accordingly.

When a NAND flash memory die into which the write data corresponding to the command 1 is to be programed (written) and a NAND flash memory die into which the write data corresponding to the command 2 is to be programed (written) are two different dies, the back end (BE) executes a data-in operation and a program command transmission process on each of these two dies. When the two dies are connected respectively to different channels, the back end (BE) is able to simultaneously execute two sets of data-in operations and program command transmission processes on the two dies. When the two dies are connected to the same channel, the back end (BE) executes the two sets of data-in operations and program command transmission processes on the two dies by a time-division method.

When the NAND flash memory die into which the write data corresponding to the command 1 is to be programed (written) and the NAND flash memory die into which the write data corresponding to the command 2 is to be programed (written) are the same die, on the other hand, the back end (BE) executes the two sets of data-in operations and program command transmission processes on this die in sequence.

When the NAND flash memory 5 receives the program command corresponding to the command 1 from the controller 4, the NAND flash memory 5 executes a program operation of programing (writing) the write data into the memory cell array 51, the write data being stored in the page buffer 52 by the data-in operation corresponding to the command 1. Time required for the program operation is referred to as program time (tPROG).

When the NAND flash memory 5 receives the program command corresponding to the command 2 from the controller 4, the NAND flash memory 5 executes a program operation of programing (writing) the write data into the memory cell array 51, the write data being stored in the page buffer 52 by the data-in operation corresponding to the command 2.

The back end (BE) transmits a read status command for confirming a status of progress of the program operation corresponding to the command 1 and a read status command for confirming a status of progress of the program operation corresponding to the command 2, to the NAND flash memory 5 (step S807). When the NAND flash memory die executing the program operation corresponding to the command 1 and the NAND flash memory die executing the program operation corresponding to the command 2 are different from each other, the read status commands are transmitted respectively to these dies. When the NAND flash memory die executing the program operation corresponding to the command 1 and the NAND flash memory die executing the program operation corresponding to the command 2 are the same die, two read status commands are transmitted to this die in sequence. In this case, one read status command may be transmitted to this die.

Based on responses to the two read status commands, the responses being received from the NAND flash memory 5, the back end (BE) determines whether the program operation corresponding to the command 1 has been completed and determines whether the program operation corresponding to the command 2 has been completed.

It is assumed in this case that the program operation corresponding to the command 1 is completed but the program operation corresponding to the command 2 is not completed.

The back end (BE) notifies the front end (FE) that the program operation corresponding to the command 1 is completed (step S808). In response to receiving this notification, the front end (FE) detects that the program operation corresponding to the command 1 is completed.

The front end (FE) transmits, to the host 2, a completion response indicating completion of the command 1 to store the completion response in the completion queue (CQy) associated with the submission queue (SQy) from which the command 1 has been fetched (step S809).

The back end (BE) transmits again the read status command for confirming the status of progress of the program operation corresponding to the command 2, to the NAND flash memory 5 (step S810).

Based on a response to the read status command, the response being received from the NAND flash memory 5, the back end (BE) determines whether the program operation corresponding to the command 2 is completed.

It is assumed in this case that the program operation corresponding to the command 2 is completed.

The back end (BE) notifies the front end (FE) that the program operation corresponding to the command 2 is completed (step S811). In response to receiving this notification, the front end (FE) detects that the program operation corresponding to the command 2 is completed.

Because the front end (FE) has detected completion of the program operation corresponding to the command 2 before transmitting an interrupt to the host 2, the interrupt indicating that there is a completion response to be processed (completion response indicating completion of the command 1), the front end (FE) skips transmission of the interrupt, that is, transmission of the interrupt including an interrupt vector associated with the completion queue (CQy) (step S812).

In this manner, when detecting completion of the program operation corresponding to the subsequent command 2 in a period of time after the completion response for the preceding command 1 is stored in the completion queue (CQy) and before transmission of the interrupt is started, the front end (FE) skips transmission of the interrupt indicating that there is a completion response to be processed (completion response indicating completion of the command 1). Specifically, when detecting completion of the program operation corresponding to the subsequent command 2 in the period of time after the completion response for the preceding command 1 is stored in the completion queue (CQy) and before transmission of the interrupt is started, the front end (FE) checks whether the interrupt vector associated with the completion queue (CQ) in which the completion response corresponding to the command 1 is stored and the interrupt vector associated with the completion queue (CQ) in which the completion response corresponding to the command 2 is to be stored are the same interrupt vector. Only when these interrupt vectors are the same interrupt vector, the frontend (FE) may skip transmission of the interrupt indicating that there is a completion response to be processed (completion response indicating completion of the command 1).

The front end (FE) transmits, to the host 2, a completion response indicating completion of the command 2 to store the completion response in the completion queue (CQy) associated with the submission queue (SQy) from which the command 2 has been fetched (step S813).

FIG. 8 illustrates a case where fetched commands are the command 1 and the command 2 and no command subsequent to the command 2 is present. After transmitting the completion response indicating completion of the command 2 to the host 2, therefore, the front end (FE) transmits an interrupt indicating that there is a completion response to be processed (completion response indicating completion of the command 1 and completion response indicating completion of the command 2), that is, an interrupt including the interrupt vector corresponding to the completion queue (CQy), to the host 2 (step S814).

Receiving this interrupt, the host 2 acquires all unprocessed completion responses from one or more completion queues associated with the interrupt vector included in the received interrupt, and processes each of the acquired completion responses. Hence, by one interrupt process executed by the host 2, the completion response corresponding to the command 1 and the completion response corresponding to the command 2 are processed at once.

Figure 9:
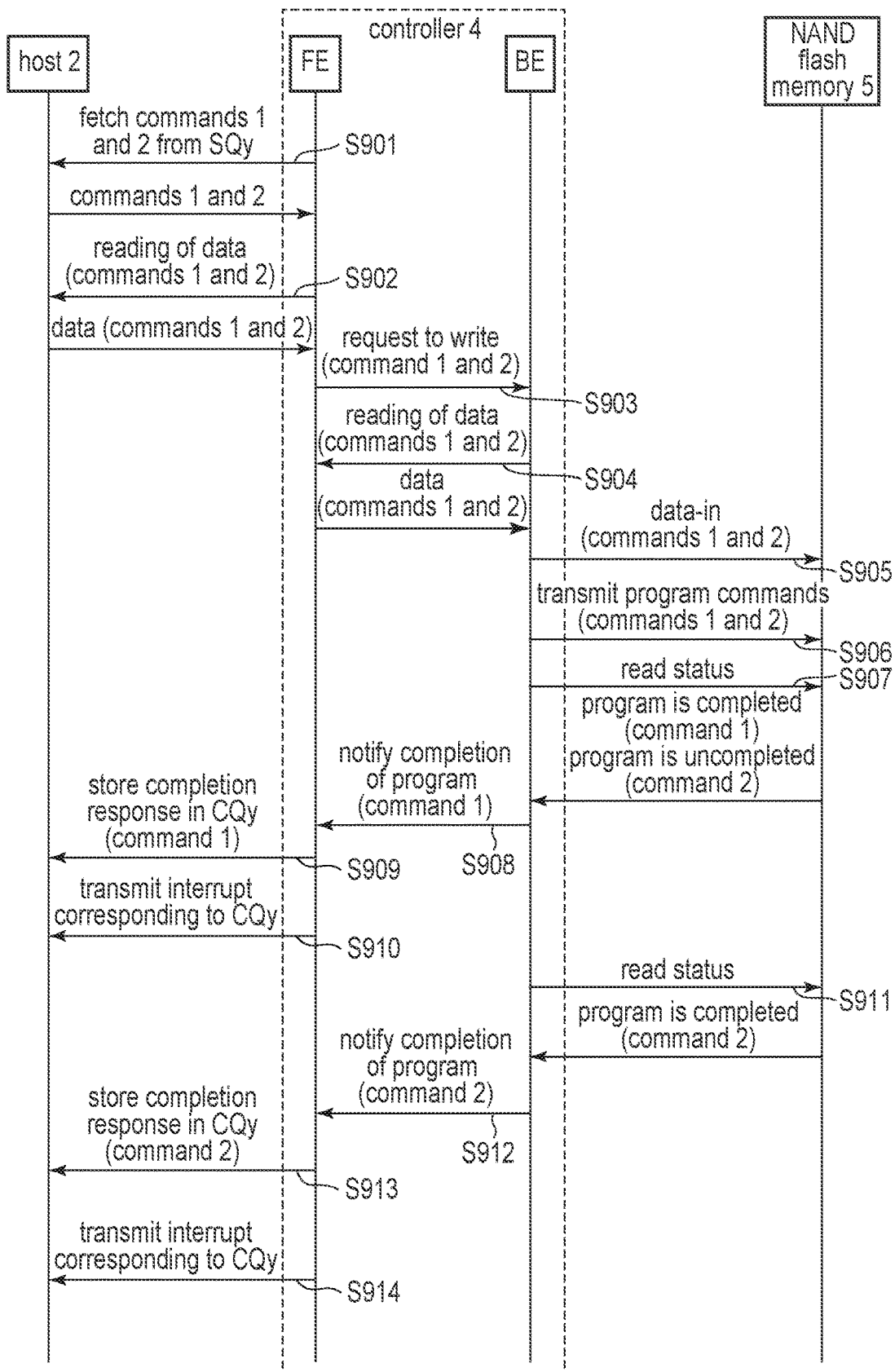
FIG. 9 is a sequence diagram illustrating a procedure of a command process that does not coalesce interrupts for two write commands, which is executed in the memory system according to the embodiment.

FIG. 9 is a sequence diagram illustrating a command process that does not coalesce interrupts for two write commands, which is executed in the memory system according to the embodiment.

Processes executed at steps S901 to S909 of FIG. 9 are the same as processes executed at steps S801 to S809 of FIG. 8 and are therefore omitted in the following description.

FIG. 9 illustrates a case where a difference in point of time of completion between the command 1 and the command 2 (more specifically, a difference between a point of time of completion of the data write operation for the command 1 and a point of time of completion of the program operation for the command 2) is large. In this case, therefore, completion of the program operation corresponding to the command 2 subsequent to the command 1 is not detected in the period of time after the completion response for the preceding command 1 is stored and before transmission of the interrupt is started. In this case, the front end (FE) does not coalesce interrupts.

After transmitting a completion response indicating completion of the command 1 to the host 2 at step S909, the front end (FE) transmits an interrupt indicating that there is a completion response to be processed (completion response indicating completion of the command 1), that is, an interrupt including an interrupt vector associated with the completion queue (CQy), to the host 2 (step S910)

In response to receiving the interrupt, the host 2 acquires all unprocessed completion responses from one or more completion queues associated with the interrupt vector included in the received interrupt, and processes each of the acquired completion responses. Thus, the completion response corresponding to the command 1 is processed by the host 2.

After executing the processing at step S907, the back end (BE) executes the processing at steps S911 to S912. Processes executed at steps S911 and S912 are the same as processes executed at steps S810 and S811 of FIG. 8.

When receiving a notification of completion of the program operation corresponding to the command 2, the notification being receiving from the back end (BE), the front end (FE) transmits, to the host 2, a completion response indicating completion of the command 2 to store the completion response in the completion queue (CQy) associated with the submission queue (SQy) from which the command 2 has been fetched (step S913).

The front end (FE) then transmits an interrupt indicating that there is a completion response to be processed (completion response indicating completion of the command 2), that is, an interrupt including the interrupt vector associated with the completion queue (CQy), to the host 2 (step S914).

In response to receiving the interrupt, the host 2 acquires all unprocessed completion responses from one or more completion queues associated with the interrupt vector included in the received interrupt, and processes each of the acquired completion responses. Thus, the completion response corresponding to the command 2 is processed by the host 2.

Figure 10:
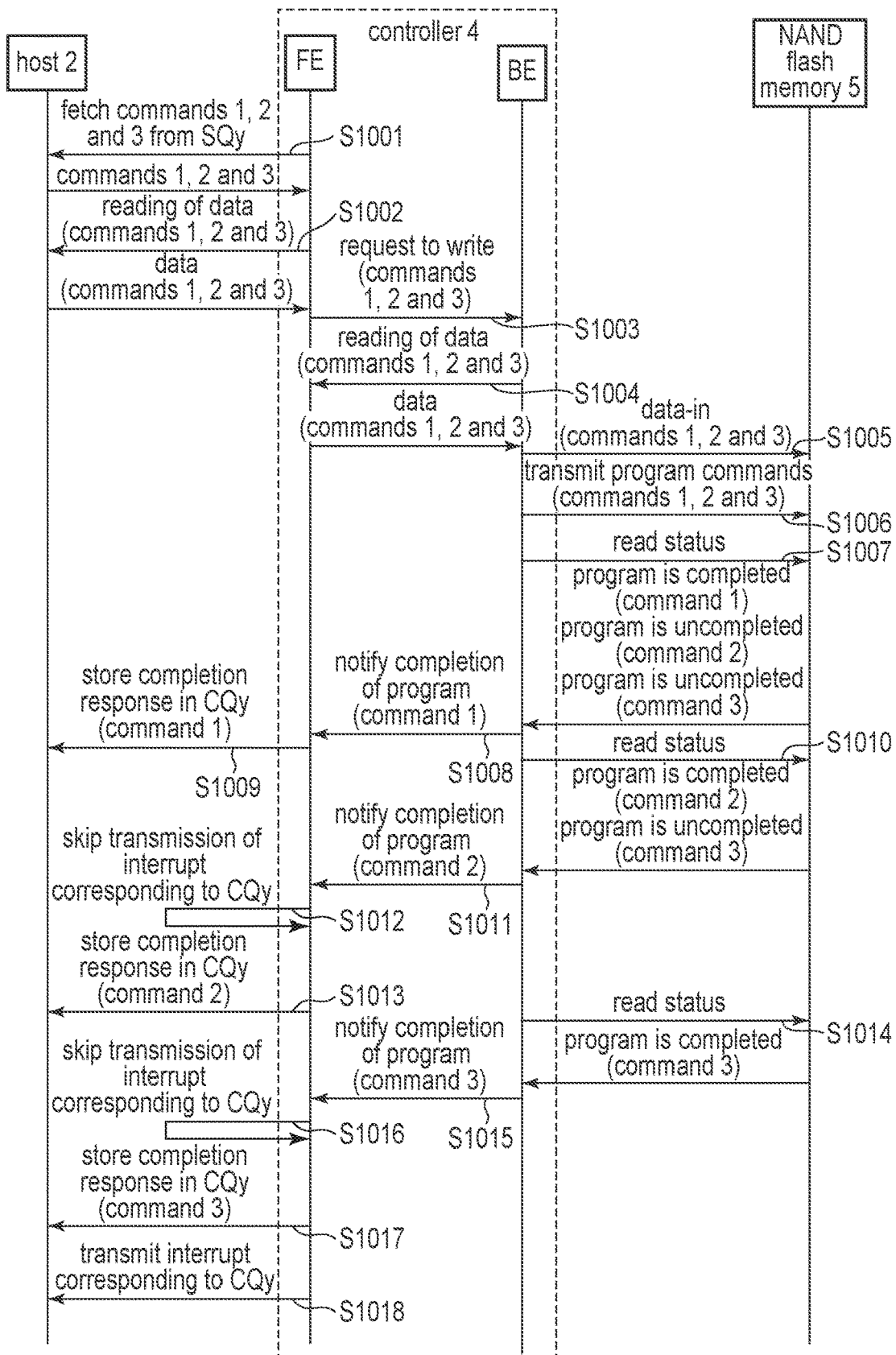
FIG. 10 is a sequence diagram illustrating a procedure of a command process that coalesces interrupts for three write commands, which is executed in the memory system according to the embodiment.

FIG. 10 is a sequence diagram illustrating a command process that coalesces interrupts for three write commands, which is executed in the memory system according to the embodiment.

When the host 2 stores three write commands (a command 1, a command 2, and a command 3) in the submission queue (SQy), the host 2 increments the value of the submission queue tail pointer (SQTP) corresponding to the submission queue (SQy) by 3. The front end (FE) of the controller 4 fetches the command 1, the command 2, and the command 3 from the submission queue (SQy) (step S1001).

The front end (FE) reads write data corresponding to the command 1, write data corresponding to the command 2, and write data corresponding to the command 3, from the memory 102 of the host 2, and stores these pieces of write data in the internal buffer 161 (step S1002).

The front end (FE) requests the back end (BE) of the controller 4 to execute the data write operation corresponding to the command 1, the data write operation corresponding to the command 2, and the data write operation corresponding to the command 3 (step S1003).

The back end (BE) reads the write data corresponding to the command 1, the write data corresponding to the command 2, and the write data operation corresponding to the command 3, from the internal buffer 161 (step S1004).

The back end (BE) then executes a data-in operation of transferring the write data corresponding to the command 1 to the page buffer 52 of the NAND flash memory 5, a data-in operation of transferring the write data corresponding to the command 2 to the page buffer 52 of the NAND flash memory 5, and a data-in operation of transferring the write data corresponding to the command 3 to the page buffer 52 of the NAND flash memory 5 (step S1005).

The back end (BE) transmits a program command for programing the write data corresponding to the command 1, a program command for programing the write data corresponding to the command 2, and a program command for programing the write data corresponding to the command 3, to the NAND flash memory 5 (step S1006). Each program command is a program instruction for programing (writing) the write data stored in the page buffer 52 of the NAND flash memory 5 into the memory cell array 51.

The back end (BE) transmits a read status command for confirming a status of progress of the program operation corresponding to the command 1, a read status command for confirming a status of progress of the program operation corresponding to the command 2, and a read status command for confirming a status of progress of the program operation corresponding to the command 3, to the NAND flash memory 5 (step S1007).

Based on responses to the three read status commands, the responses being received from the NAND flash memory 5, the back end (BE) determines whether the program operation corresponding to the command 1 is completed, whether the program operation corresponding to the command 2 is completed, and whether the program operation corresponding to the command 3 is completed.

It is assumed in this case that the program operation corresponding to the command 1 is completed but neither the program operation corresponding to the command 2 nor the program operation corresponding to the command 3 is completed.

The back end (BE) notifies the front end (FE) that the program operation corresponding to the command 1 is completed (step S1008). In response to receiving this notification, the front end (FE) detects that the program operation corresponding to the command 1 is completed.

The front end (FE) transmits, to the host 2, a completion response indicating completion of the command 1 to store the completion response in the completion queue (CQy) associated with the submission queue (SQy) from which the command 1 has been fetched (step S1009)

The back end (BE) transmits again the read status command for confirming the status of progress of the program operation corresponding to the command 2 and the read status command for confirming the status of progress of the program operation corresponding to the command 3, to the NAND flash memory 5 (step S1010).

Based on responses to two read status commands, the responses being received from the NAND flash memory 5, the back end (BE) determines whether the program operation corresponding to the command 2 is completed and whether the program operation corresponding to the command 3 is completed.

It is assumed in this case that the program operation corresponding to the command 2 is completed but the program operation corresponding to the command 3 is not completed.

The back end (BE) notifies the front end (FE) that the program operation corresponding to the command 2 is completed (step S1011). In response to receiving this notification, the front end (FE) detects that the program operation corresponding to the command 2 is completed.

Because the front end (FE) has detected completion of the program operation corresponding to the command 2 before transmitting an interrupt to the host 2, the interrupt indicating that there is a completion response to be processed (completion response indicating completion of the command 1), the front end (FE) skips transmission of the interrupt, that is, transmission of the interrupt including an interrupt vector associated with the completion queue (CQy) (step S1012)

The front end (FE) transmits, to the host 2, a completion response indicating completion of the command 2 to store the completion response in the completion queue (CQy) associated with the submission queue (SQy) from which the command 2 has been fetched (step S1013).

The back end (BE) transmits again the read status command for confirming the status of progress of the program operation corresponding to the command 3, to the NAND flash memory 5 (step S1014).

Based on a response to the read status command, the response being received from the NAND flash memory 5, the back end (BE) determines whether the program operation corresponding to the command 3 is completed.

It is assumed in this case that the program operation corresponding to the command 3 is completed.

The back end (BE) notifies the front end (FE) that the program operation corresponding to the command 3 is completed (step S1015). In response to receiving this notification, the front end (FE) detects that the program operation corresponding to the command 3 is completed.

Because the front end (FE) has detected completion of the program operation corresponding to the command 3 before transmitting an interrupt to the host 2, the interrupt indicating that there are completion responses to be processed (completion response indicating completion of the command 1 and completion response indicating completion of the command 2), the front end (FE) skips transmission of the interrupt, that is, transmission of the interrupt including an interrupt vector associated with the completion queue (CQy) (step S1016).

The front end (FE) transmits, to the host 2, a completion response indicating completion of the command 3 to store the completion response in the completion queue (CQy) associated with the submission queue (SQy) from which the command 3 has been fetched (step S1017).

FIG. 10 illustrates a case where fetched commands are the command 1 to the command 3 and no command subsequent to the command 3 is present. After transmitting the completion response indicating completion of the command 3 to the host 2, therefore, the front end (FE) transmits an interrupt indicating that there are completion responses to be processed (completion response indicating completion of the command 1, completion response indicating completion of the command 2, and completion response indicating completion of the command 3), that is, an interrupt including the interrupt vector corresponding to the completion queue (CQy), to the host 2 (step S1018).

In response to receiving this interrupt, the host 2 acquires all unprocessed completion responses from one or more completion queues associated with the interrupt vector included in the received interrupt, and processes each of the acquired completion responses. Hence, by one interrupt process executed by the host 2, three completion responses corresponding respectively to the command 1 to the command 3 are processed at once.

In the above description, interrupt coalescing control has been explained for a case where the preceding command is a read command and the subsequent command is also a read command, and for a case where the preceding command is a write command and the subsequent command is also a write command.

In a case where the preceding command is a read command and the subsequent command is a write command, the controller 4 executes the interrupt coalescing when completion of the program operation corresponding to the subsequent write command is detected in a period of time after a completion response for the preceding read command is stored and before transmission of an interrupt is started.

In a case where the preceding command is a write command and the subsequent command is a read command, the controller 4 executes the interrupt coalescing when completion of the sense operation corresponding to the subsequent read command is detected in a period of time after a completion response for the preceding write command is stored and before transmission of an interrupt is started.

A process of preventing the interrupt coalescing for a plurality of commands processed in succession from being executed endlessly will be described.

To prevent the interrupt coalescing being executed endlessly, in the controller 4, (i) an upper limit value representing the upper limit to the number of times that a completion response is capable of being transmitted to the host 2 without transmitting an interrupt to the host 2, or (ii) a maximum time representing the maximum of time during which a completion response is capable of being transmitted to the host 2 without transmitting an interrupt to the host 2, may be set.

When the number of times of transmitting a completion response to the host 2 without transmitting an interrupt to the host 2 reaches the upper limit value, the controller 4 ends the interrupt coalescing, and transmits the interrupt to the host 2. When the controller 4 transmits the interrupt to the host 2, the controller 4 resets the number of times of transmitting a completion response to the host 2 without transmitting the interrupt, to zero. As a result, the controller 4 restarts the interrupt coalescing.

Alternatively, when time elapsed since a completion response was transmitted to the host 2 without transmitting an interrupt to the host 2 reaches the maximum time, the controller 4 ends the interrupt coalescing, and transmits the interrupt to the host 2. When the controller 4 transmits the interrupt to the host 2, the controller 4 resets the value representing the time elapsed, to zero. As a result, the controller 4 restarts the interrupt coalescing.

A case where the upper limit value of the number of times that a completion response is capable of being transmitted to the host 2 without transmitting an interrupt to the host 2 is set will first be described. FIG. 11 is a sequence diagram illustrating a procedure of a command process including a process of limiting the number of times that a completion response is capable of being transmitted to the host without transmitting an interrupt to the host, the command process being executed in the memory system according to the embodiment. A case where the upper limit value is set to 2 will be described.

FIG. 11 illustrates a case similarly to the case of FIG. 10, where three write commands (the command 1 and the command 2, and the command 3) are fetched from the host 2. Processes executed at steps S1101 to S1115 of FIG. 11 are the same as processes executed at steps S1001 to S1015 of FIG. 10 and are therefore omitted in the following description.

In the processes at steps S1101 to S1115, the program operation corresponding to the command 3 is completed in a period of time after the completion response corresponding to the command 2 is stored and before transmission of the interrupt is started. A condition for the interrupt coalescing is thus satisfied.

However, because the completion response corresponding to the command 1 and the completion response corresponding to the command 2 have been transmitted to the host 2 at steps S1109 and S1113, respectively, the number of times of transmitting a completion response to the host 2 without transmitting an interrupt has reached the upper limit value (which is 2 in this case).

Thus, the front end (FE) transmits an interrupt indicating that there are completion responses to be processed (completion response indicating completion of the command 1 and completion response indicating completion of the command 2), that is, an interrupt including an interrupt vector corresponding to the completion queue (CQy), to the host 2 (step S1116).

In response to receiving this interrupt, the host 2 acquires all unprocessed completion responses from one or more completion queues associated with the interrupt vector included in the received interrupt, and processes each of the acquired completion responses. Hence, by one interrupt process executed by the host 2, two completion responses corresponding respectively to the command 1 and the command 2 are processed at once.

Because the front end (FE) is already notified of completion of the program operation corresponding to the command 3, the front end (FE) transmits, to the host 2, a completion response indicating completion of the command 3 to store the completion response in the completion queue (CQy) associated with the submission queue (SQy) from which the command 3 has been fetched (step S1117).

The controller 4 then starts the interrupt coalescing again. For example, when completion of a program operation or a sense operation corresponding to a command 4 subsequent to the command 3 is detected in a period of time after the completion response corresponding to the command 3 is stored and before transmission of the interrupt is started, the front end (FE) skips transmission of the interrupt and transmits a completion response corresponding to the command 4, to the host 2. On the other hand, when completion of the program operation or the sense operation corresponding to the command 4 is not detected in the period of time after the completion response corresponding to the command 3 is stored and before transmission of the interrupt is started, the front end (FE) transmits the interrupt to the host 2.

FIG. 11 illustrates a case where fetched commands are the command 1 to the command 3 and the command 4 subsequent to the command 3 is not present. Therefore, after transmitting the completion response indicating completion of the command 3 to the host 2, the front end (FE) transmits an interrupt indicating that there is a completion response to be processed (completion response indicating completion of the command 3), that is, an interrupt including the interrupt vector corresponding to the completion queue (CQy), to the host 2 (step S1118).

Figure 12:
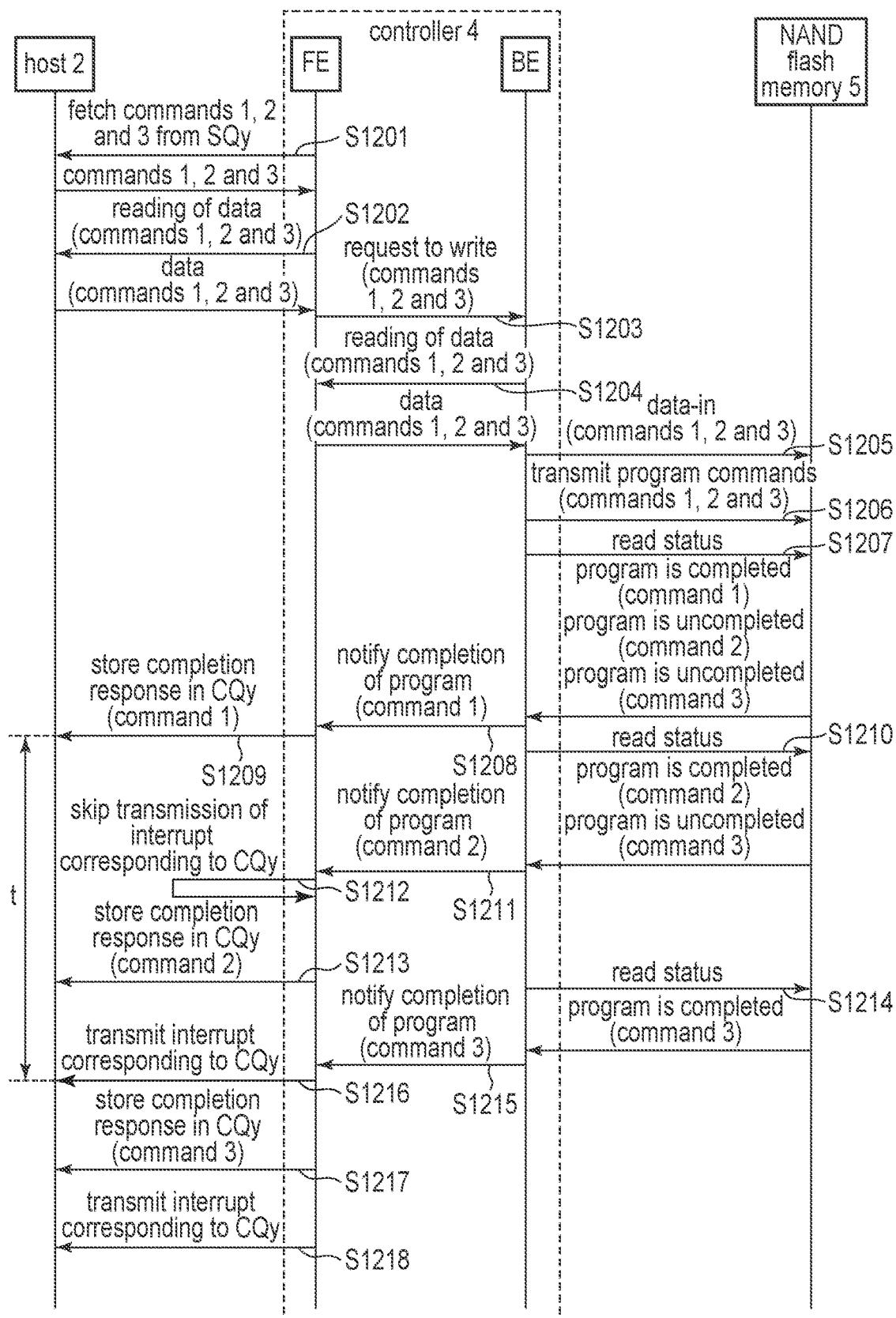
FIG. 12 is a sequence diagram illustrating a procedure of a command process including a process of limiting time during which a completion response is capable of being transmitted to the host without transmitting an interrupt to the host, the command process being executed in the memory system according to the embodiment.

A case where the maximum time during which a completion response is capable of being transmitted to the host 2 without transmitting an interrupt to the host 2 is set will be described. FIG. 12 is a sequence diagram illustrating a procedure of a command process including a process of limiting time during which a completion response is capable of being transmitted to the host 2 without transmitting an interrupt to the host 2, the command process being executed in the memory system according to the embodiment. A case where the maximum time is "t" will be described.

Processes executed at steps S1201 to S1209 of FIG. 12 are the same as processes executed at steps S1001 to S1009 of FIG. 10, and are therefore omitted in the following description.

Upon transmitting a completion response indicating completion of the command 1 to the host 2 (step S1209), the controller 4 starts a timer (not illustrated) to start measuring time elapsed since the completion response was transmitted.

Subsequently, the controller 4 executes steps S1210 to S1215. Processes executed at steps S1210 to S1215 are the same as processes executed at steps S1010 to S1015 of FIG. 10, and are therefore omitted in the following description.

In this case, the program operation corresponding to the command 3 is completed in a period of time after the completion response corresponding to the command 2 is stored and before transmission of the interrupt is started. A condition for the interrupt coalescing is thus satisfied.

The time elapsed, however, has reached the maximum time t. The front end (FE), therefore, transmits an interrupt indicating that there are completion responses to be processed (completion response indicating completion of the command 1 and completion response indicating completion of the command 2), that is, an interrupt including an interrupt vector corresponding to the completion queue (CQy), to the host 2 (step S1216).

In response to receiving this interrupt, the host 2 acquires all unprocessed completion responses from one or more completion queues associated with the interrupt vector included in the received interrupt, and processes each of the acquired completion responses. Hence, by one interrupt process executed by the host 2, two completion responses corresponding respectively to the command 1 and the command 2 are processed at once.

Because the front end (FE) is already notified of completion of the program operation corresponding to the command 3, the front end (FE) transmits, to the host 2, a completion response indicating completion of the command 3 to store the completion response in the completion queue (CQy) associated with the submission queue (SQy) from which the command 3 has been fetched (step S1217).

The controller 4 then starts the interrupt coalescing again. In this case, the timer is restarted at step S1217. For example, when completion of the program operation or the sense operation corresponding to the command 4 subsequent to the command 3 is detected in the period of time after the completion response corresponding to the command 3 is stored and before transmission of the interrupt is started, the front end (FE) skips transmission of the interrupt and transmits the completion response corresponding to the command 4, to the host 2. On the other hand, when completion of the program operation or the sense operation corresponding to the command 4 is not detected in the period of time after the completion response corresponding to the command 3 is stored and before transmission of the interrupt is started, the front end (FE) transmits the interrupt to the host 2.

FIG. 12 illustrates a case where fetched commands are the command 1 to the command 3 and the command 4 subsequent to the command 3 is not present. After transmitting the completion response indicating completion of the command 3 to the host 2, therefore, the front end (FE) transmits an interrupt indicating that there is a completion response to be processed (completion response indicating completion of the command 3), that is, an interrupt including the interrupt vector corresponding to the completion queue (CQy), to the host 2 (step S1218).

Figure 13:
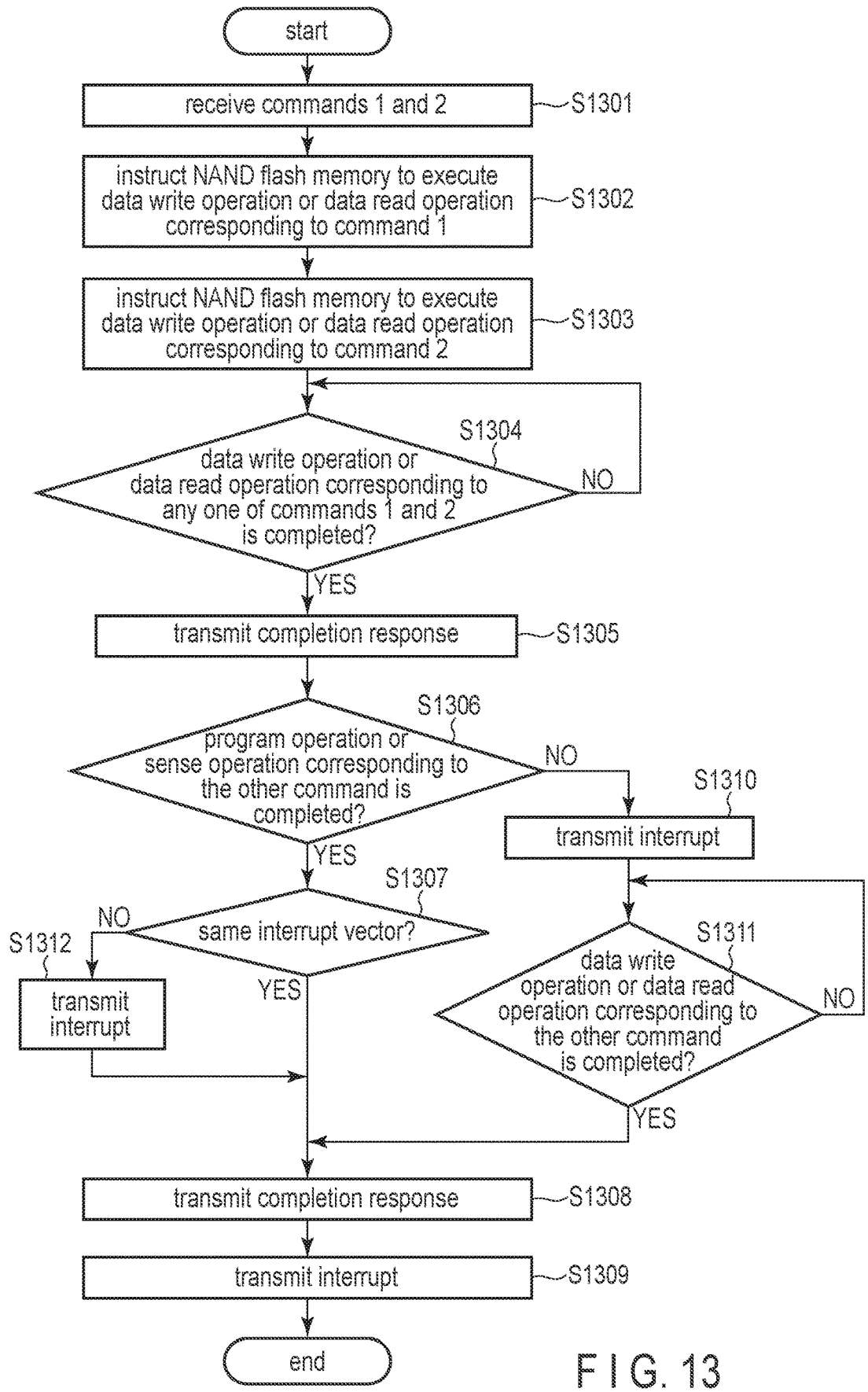
FIG. 13 is a flowchart illustrating a procedure for processing two commands, the procedure being executed in the memory system according to the embodiment.

Next, a procedure for processing two commands will be described. FIG. 13 is a flowchart illustrating a procedure for processing two commands, the procedure being executed in the memory system according to the embodiment. It is assumed in this case that only two commands are received from the host 2 and a command subsequent to these two commands is not received.

The controller 4 receives a command 1 and a command 2 from the host 2 (step S1301). Each of the command 1 and the command 2 is an I/O command. Each of the command 1 and the command 2 may be either a read command or a write command.

The controller 4 instructs the NAND flash memory 5 to execute the I/O operation corresponding to the command 1, that is, the data write operation or the data read operation corresponding to the command 1 (step S1302). When the command 1 is a write command, the controller 4 instructs the NAND flash memory 5 to execute a data-in operation and a program operation. When the command 1 is a read command, the controller 4 instructs the NAND flash memory 5 to execute a sense operation and a data-out operation.

The controller 4 instructs the NAND flash memory 5 to execute the I/O operation (the data write operation or the data read operation) corresponding to the command 2 (step S1303).

The controller 4 determines whether the data write operation or the data read operation corresponding to one command among the command 1 and the command 2 is completed (step S1304).

When the data write operation or the data read operation corresponding to the command 1 is not completed and the data write operation or the data read operation corresponding to the command 2 is not completed (No at step S1304), the controller 4 waits for completion of the data write operation or the data read operation corresponding to the one command among the command 1 and the command 2.

When the data write operation or the data read operation corresponding to the one command among the command 1 and the command 2 is completed (Yes at step S1304), the controller 4 transmits a completion response indicating completion of the one command among the command 1 and the command 2, to the host 2 (step S1305).

The controller 4 determines whether the program operation or the sense operation corresponding to the other command among the command 1 and the command 2 is completed in a period of time after the completion response indicating completion of the one command is transmitted and before transmission of the interrupt corresponding to the completion response is started (step S1306).

When the program operation or the sense operation corresponding to the other command is completed in the period of time after transmission of the completion response corresponding to the one command is completed and before transmission of the interrupt corresponding to the completion response indicating completion of the one command is started (Yes at step S1306), the controller 4 determines whether an interrupt vector associated with a completion queue (CQ) in which the completion response corresponding to the one command is stored and an interrupt vector associated with a completion queue (CQ) in which the completion response corresponding to the other command is to be stored are the same interrupt vector (step S1307).

When the interrupt vectors are the same interrupt vector (Yes at step S1307), the controller 4 decides to execute the interrupt coalescing. In this case, the controller 4 does not transmit an interrupt including the same interrupt vector to the host 2, but transmits the completion response corresponding to the other command to the host 2 after the data write operation or the data read operation corresponding to the other command is completed (step S1308).

After transmitting the completion response corresponding to the other command to the host 2, the controller 4 then transmits the interrupt including the same interrupt vector to the host 2 (step S1309).

When the interrupt vectors are not the same interrupt vector (No at step S1307), the controller 4 decides not to execute the interrupt coalescing. In this case, the controller 4 transmits an interrupt including the interrupt vector associated with the completion queue (CQ) in which the completion response corresponding to the one command is stored, to the host 2 (step S1312).

After transmitting the interrupt to the host 2, the controller 4 transmits the completion response corresponding to the other command to the host 2 after the data write operation or the data read operation corresponding to the other command is completed (step S1308).

After transmitting the completion response corresponding to the other command to the host 2, the controller 4 transmits an interrupt including the interrupt vector associated with the completion queue (CQ) in which the completion response corresponding to the other command is stored, to the host 2 (step S1309).

When the program operation or the sense operation corresponding to the other command is not completed in the period of time after transmission of the completion response corresponding to the one command is completed and before transmission of the interrupt is started (No at step S1306), the controller 4 decides not to execute the interrupt coalescing. In this case, the controller 4 transmits an interrupt including the interrupt vector associated with the completion queue (CQ) in which the completion response corresponding to the one command is stored, to the host 2 (step S1310).

The controller 4 then determines whether the data write operation or the data read operation corresponding to the other command is completed (step S1311).

When the data write operation or the data read operation corresponding to the other command is not completed (No at step S1311), the controller 4 waits for completion of the data write operation or the data read operation corresponding to the other command.

When the data write operation or the data read operation corresponding to the other command is completed (Yes at step S1311), the controller 4 transmits the completion response corresponding to the other command to the host 2 (step S1308).

After transmitting the completion response corresponding to the other command to the host 2, the controller 4 transmits an interrupt including the interrupt vector associated with the completion queue (CQ) in which the completion response corresponding to the other command is stored, to the host 2 (step S1309).

Figure 14:
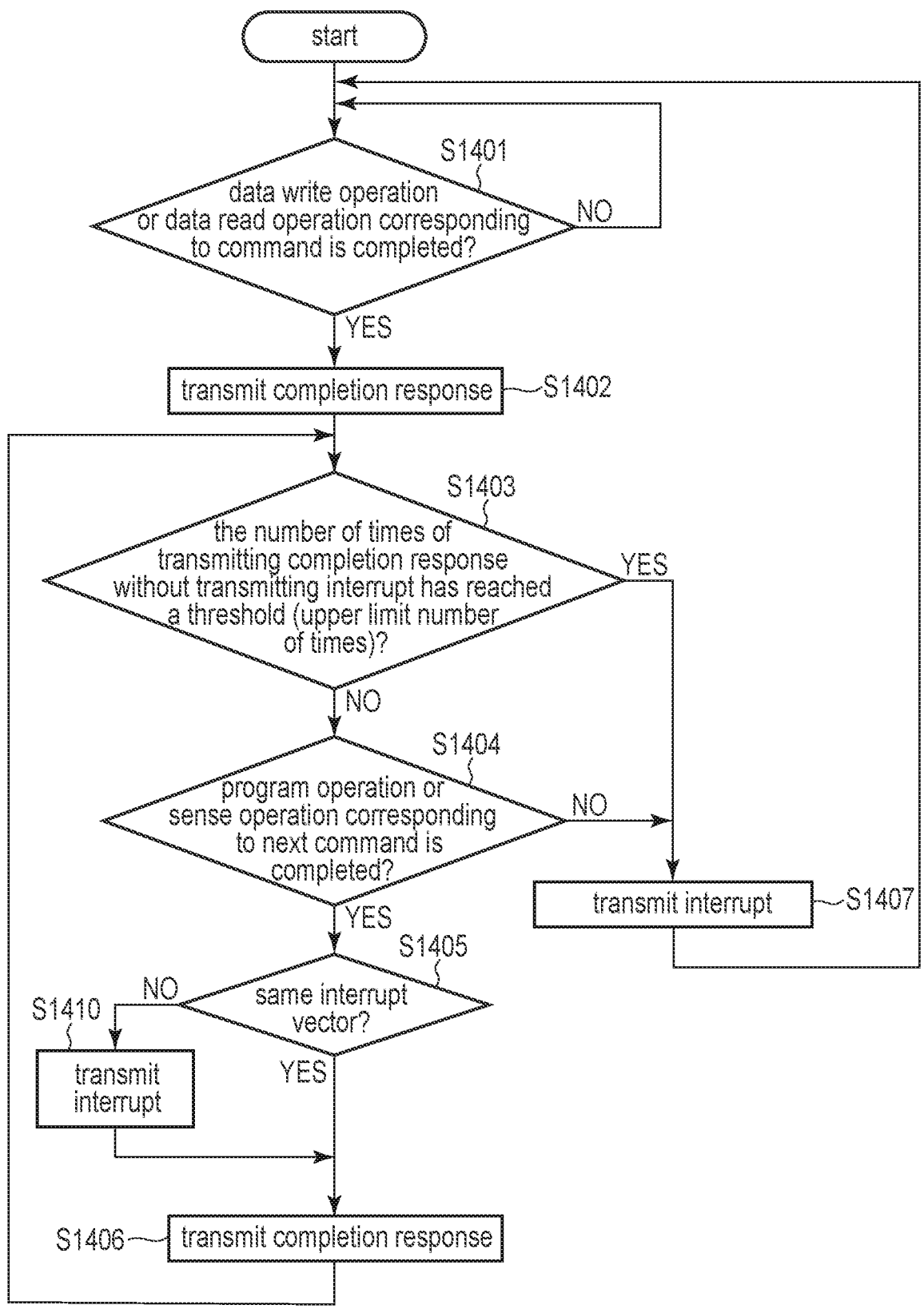
FIG. 14 is a flowchart illustrating a procedure for ending the interrupt coalescing, which is executed in the memory system according to the embodiment.

FIG. 14 is a flowchart illustrating a procedure for ending the interrupt coalescing when the number of completion responses that are transmitted to the host without transmitting an interrupt to the host reaches an upper limit, the procedure being executed by the memory system according to the embodiment.

It is assumed in this case that the controller 4 receives a plurality of commands from the host 2 in succession and instructs the NAND flash memory 5 in succession to execute a plurality of data write operations or data read operations corresponding respectively to the received commands. Each of the received commands is an I/O command.

The controller 4 determines whether a data write operation or a data read operation corresponding to a command received first is completed (step S1401).

When the data write operation or the data read operation corresponding to the command received first is not completed (No at step S1401), the controller 4 waits until the data write operation or the data read operation corresponding to the command received first is completed.

When the data write operation or the data read operation corresponding to the command received first is completed (Yes at step S1401), the controller 4 transmits the completion response corresponding to the command received first, to the host 2 (step S1402).

The controller 4 determines whether the number of times of transmitting a completion response to the host 2 without transmitting an interrupt has reached a threshold (upper limit number of times) (step S1403).

When the number of times of transmitting a completion response to the host 2 without transmitting an interrupt has not reach the threshold (No at step S1403), the controller 4 determines whether the program operation or the sense operation corresponding to the next command is completed in a period of time after the completion response corresponding to the command received first is transmitted and before transmission of an interrupt is started (step S1404).

When the program operation or the sense operation corresponding to the next command is not completed in the period of time after the completion response corresponding to the command received first is transmitted and before transmission of the interrupt is started (No in step S1404), the controller 4 decides not to execute the interrupt coalescing. In this case, the controller 4 proceeds to step S1407, at which the controller 4 transmits an interrupt to the host 2. After transmitting the interrupt to the host 2, the controller 4 returns to step S1401, at which the controller 4 waits for completion of the data write operation or the data read operation corresponding to the next command (step S1401). When the data write operation or the data read operation corresponding to the next command is completed (Yes at step S1401), the controller 4 transmits the completion response corresponding to the next command to the host 2 (step S1402). The controller 4 then proceeds to step S1403.

When the program operation or the sense operation corresponding to the next command is completed in the period of time after the completion response corresponding to the command received first is transmitted and before transmission of the interrupt is started (Yes at step S1404), the controller 4 determines whether an interrupt vector associated with the completion queue (CQ) in which the completion response corresponding to the command received first is stored and an interrupt vector associated with the completion queue (CQ) in which the completion response corresponding to the next command is to be stored are the same interrupt vector (step S1405).

When the interrupt vectors are not the same (No at step S1405), the controller 4 decides not to execute the interrupt coalescing. In this case, the controller 4 proceeds to step S1410. That is, the controller 4 transmits an interrupt including the interrupt vector associated with the completion queue (CQ) in which the completion response corresponding to the command received first is stored, to the host 2. After the data write operation or the data read operation corresponding to the next command is completed, the controller 4 transmits the completion response corresponding to the next command to the host 2 (step S1406). The controller 4 then returns to step S1403.

When the interrupt vectors are the same interrupt vector (Yes at step S1405), the controller 4 decides to execute the interrupt coalescing. In this case, the controller 4 does not transmit the interrupt, but transmits the completion response corresponding to the next command to the host 2 after the data write operation or the data read operation corresponding to the next command is completed (step S1406). The controller 4 then returns to step S1403, at which the controller 4 determines whether the number of times of transmitting a completion response to the host 2 without transmitting an interrupt has reached the threshold.

When the number of times of transmitting a completion response to the host 2 without transmitting an interrupt has not reached the threshold (No at step S1403), the controller 4 determines whether or not to execute the interrupt coalescing for another subsequent command.

In this manner, in a period during which the number of times of transmitting a completion response to the host 2 without transmitting an interrupt does not reach the threshold (No at step S1403), as long as the condition for executing the interrupt coalescing is satisfied (Yes at step S1404 and Yes at step S1405), the controller 4 repeatedly executes a process of transmitting a completion response corresponding to a command of which the data write operation or the data read operation is completed, to the host 2 without transmitting an interrupt.

As a result of repeatedly executing the process of transmitting a completion response to the host 2 without transmitting an interrupt, the number of times of transmitting a completion response to the host 2 without transmitting an interrupt finally reaches the threshold (Yes at step S1403). In this case, the controller 4 transmits an interrupt to the host 2 (step S1407), thus ending the interrupt coalescing.

This transmission of the interrupt to the host 2 resets the number of times of transmitting a completion response to the host 2 without transmitting an interrupt, to zero. The controller 4 thus restarts the interrupt coalescing. At the restart of the interrupt coalescing, the controller 4 returns to step S1401. Specifically, the controller 4 waits for completion of the data write operation or the data read operation corresponding to the next command (step S1401). When the data write operation or the data read operation corresponding to the next command is completed (Yes at step S1401), the controller 4 transmits the completion response corresponding to the next command to the host 2 (step S1402). The controller 4 then proceeds to step S1403.

Figure 15:
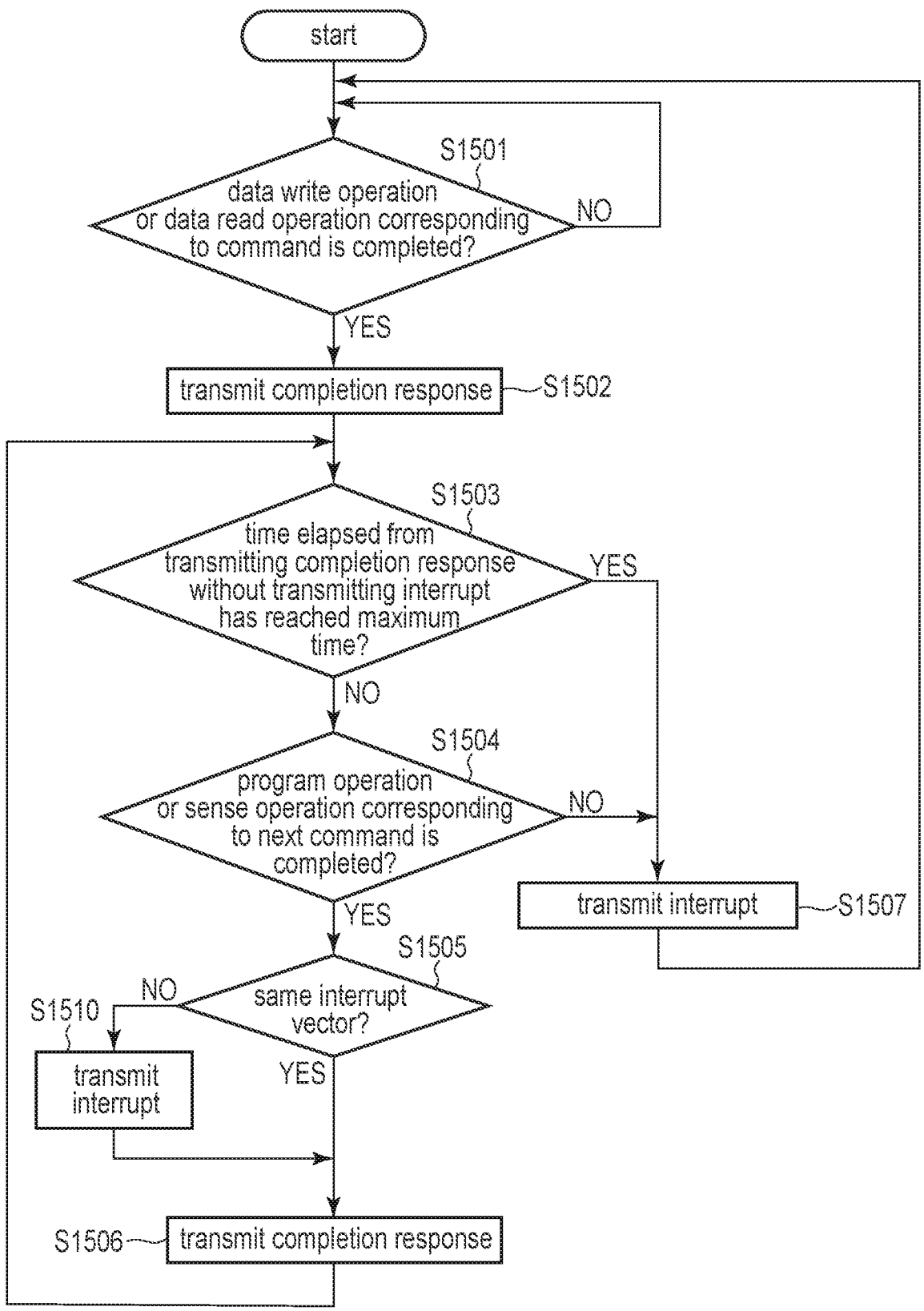
FIG. 15 is a flowchart illustrating another procedure for ending the interrupt coalescing, which is executed in the memory system according to the embodiment.

FIG. 15 is a flowchart illustrating a procedure for ending the interrupt coalescing when time elapsed since a completion response was transmitted to the host without transmitting an interrupt reaches the maximum time, the procedure being executed in the memory system according to the embodiment.

The procedure of FIG. 15 is different from the procedure described with reference to FIG. 14 only in the condition for ending the interrupt coalescing. Specifically, processing executed at steps S1501, S1502, and S1504 to S1510 of FIG. 15 are the same as the processing executed at steps S1401, S1402, and S1404 to S1410 of FIG. 14, respectively. According to the procedure of FIG. 15, time during which a completion response is capable of being transmitted to the host 2 without transmitting an interrupt is limited to the threshold (maximum time).

When the time elapsed since a completion response was transmitted to the host 2 without transmitting an interrupt does not reach the maximum time (No at step S1503), as long as the condition for executing the interrupt coalescing is satisfied (Yes at step S1504 and Yes at step S1505), the controller 4 repeatedly executes a process of transmitting a completion response corresponding to a command of which the data write operation or the data read operation is completed, to the host 2 without transmitting an interrupt.

As a result of repeatedly executing the process of transmitting a completion response to the host 2 without transmitting an interrupt, the time elapsed since the completion response was transmitted to the host 2 without transmitting the interrupt finally reaches the threshold (Yes at step S1503). In this case, the controller 4 transmits an interrupt to the host 2 (step S1507), thus ending the interrupt coalescing.

This transmission of the interrupt to the host 2 resets the time elapsed since the completion response was transmitted to the host 2 without transmitting the interrupt, to zero. The controller 4 thus restarts the interrupt coalescing. At the restart of the interrupt coalescing, the controller 4 returns to step S1501. Specifically, the controller 4 waits for completion of the data write operation or the data read operation corresponding to the next command (step S1501). When the data write operation or the data read operation corresponding to the next command is completed (Yes at step S1501), the controller 4 transmits the completion response corresponding to the next command to the host 2 (step S1502). The controller 4 then proceeds to step S1503.

As described above, according to this embodiment, when detecting completion of a second program operation or a second sense operation corresponding to a second I/O command subsequent to the first I/O command in a first period after a first completion response indicating completion of a first I/O command is transmitted to the host 2 and before transmission of a first interrupt to the host 2 is started, the first interrupt at least indicating that there is the first completion response to be processed, the controller 4 executes the interrupt coalescing. In this case, the controller 4 waits for completion of a second data write operation or a second data read operation corresponding to the second I/O command, without transmitting the first interrupt to the host 2. In response to detecting the completion of the second data write operation or the second data read operation, the controller 4 transmits a second completion response indicating completion of the second I/O command to the host 2, and transmits the first interrupt to the host 2 after the second completion response is transmitted to the host 2. Because the first completion response and the second completion response have already been transmitted to the host 2, the host 2 is allowed to handle the first interrupt as the interrupt corresponding to the first completion response and the second completion response. In other words, the first interrupt can indicate that there are the first completion response and the second completion response as completion responses to be processed.

When not detecting the completion of the second program operation or the second sense operation in the first period, the controller 4 does not execute the interrupt coalescing. In this case, the controller 4 transmits the first interrupt indicating that there is the first completion response to be processed, to the host 2. In response to detecting the completion of the second data write operation or the second data read operation, the controller 4 then transmits the second completion response to the host 2.

In this manner, the controller 4 adaptively controls the interrupt coalescing, based on respective statuses of progress of a plurality of data write operations or data read operations executed in the NAND flash memory 5. Therefore, the controller 4 prevents an increase in latency from when a completion response for a certain I/O command is transmitted to the host 2 to when the completion response is processed by the host 2, and at the same time, reduces overhead of the host 2 caused by interrupt processes. Hence the I/O access performance of the host 2 is improved.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, the memory system comprising:
    a nonvolatile memory including a page buffer and a memory cell array; and
    a controller electrically connected to the nonvolatile memory and configured to execute a plurality of data write operations or data read operations respectively corresponding to a plurality of input/output (I/O) commands received from the host,
    each of the plurality of data write operations including at least a data-in operation of transferring write data from the controller to the page buffer, and a program operation of programing the write data from the page buffer into the memory cell array,
    each of the plurality of data read operations including at least a sense operation of reading read data from the memory cell array to the page buffer, and a data-out operation of transferring the read data from the page buffer to the controller, wherein
    the controller is further configured to:
        in response to detecting completion of a first data write operation or a first data read operation corresponding to a first I/O command among the plurality of I/O commands, transmit a first completion response indicating completion of the first I/O command to the host;
        when detecting completion of a second program operation or a second sense operation corresponding to a second I/O command subsequent to the first I/O command in a first period after the first completion response is transmitted to the host and transmission of a first interrupt to the host is started, the first interrupt indicating at least that there is the first completion response to be processed, wait for completion of a second data write operation or a second data read operation corresponding to the second I/O command, without transmitting the first interrupt to the host, and in response to detecting the completion of the second data write operation or the second data read operation, transmit a second completion response indicating completion of the second I/O command to the host, and transmit the first interrupt to the host after the second completion response is transmitted to the host, and when not detecting the completion of the second program operation or the second sense operation in the first period, transmit the first interrupt to the host; and in response to detecting the completion of the second data write operation or the second data read operation, transmit the second completion response to the host.

2. The memory system of according to claim 1, wherein the controller is further configured to:

when detecting completion of a third program operation or a third sense operation corresponding to a third I/O command subsequent to the second I/O command in a second period after the second completion response is transmitted to the host and before transmission of a second interrupt to the host is started, the second interrupt indicating at least that there is the second completion response to be processed, wait for completion of a third data write operation or a third data read operation corresponding to the third I/O command, without transmitting the second interrupt to the host, and in response to detecting the completion of the third data write operation or the third data read operation, transmit a third completion response indicating completion of the third I/O command to the host, and transmit the second interrupt to the host after the third completion is transmitted to the host; and when not detecting the completion of the third program operation or the third sense operation in the second period, transmit the second interrupt to the host; and in response to detecting the completion of the third data write operation or the third data read operation, transmit the third completion response to the host.

3. The memory system according to claim 1, wherein the controller is further configured to:

when detecting the completion of the second program operation or the second sense operation in the first period, determine whether a first interrupt vector associated with a completion queue of the host in which the first completion response is stored, and a second interrupt vector associated with a completion queue of the host in which the second completion response is to be stored, are a same interrupt vector, when the first interrupt vector and the second interrupt vector are the same interrupt vector, wait for the completion of the second data write operation or the second data read operation, without transmitting the first interrupt to the host, and in response to detecting the completion of the second data write operation or the second data read operation, transmit the second completion response to the host, and transmit the first interrupt to the host after the second completion response is transmitted to the host; and when the first interrupt vector and the second interrupt vector are not the same interrupt vector, transmit the first interrupt to the host; and in response to detecting the completion of the second data write operation or the second data read operation after the first interrupt is transmitted to the host, transmit the second completion response to the host.

4. The memory system according to claim 1, wherein the controller is further configured to:

when a number of times of transmitting a completion response to the host without transmitting the first interrupt reaches a threshold by transmitting the first completion response and the second completion response to the host without transmitting the first interrupt, transmit the first interrupt to the host; and in response to detecting completion of a third data write operation or a third data read operation corresponding to a third I/O command subsequent to the second I/O command, transmit a third completion response to the host, the third completion response indicating completion of the third I/O command; and when detecting completion of a fourth program operation or a fourth sense operation corresponding to a fourth I/O command subsequent to the third I/O command in a third period after the third completion response is transmitted to the host and before transmission of a third interrupt to the host is started, the third interrupt indicating at least that there is the third completion response to be processed, wait for completion of a fourth data write operation or a fourth data read operation corresponding to the fourth I/O command, without transmitting the third interrupt to the host, and in response to detecting the completion of the fourth data write operation or the fourth data read operation, transmit a fourth completion response indicating completion of the fourth I/O command to the host.

5. The memory system according to claim 1, wherein the controller is further configured to:

when time elapsed since the first completion response is transmitted to the host reaches a threshold after the first completion response and the second completion response are transmitted to the host without transmitting the first interrupt, transmit the first interrupt to the host;

in response to detecting completion of a third data write operation or a third data read operation corresponding to a third I/O command subsequent to the second I/O command, transmit a third completion response to the host, the third completion response indicating completion of the third I/O command; and when detecting completion of a fourth program operation or a fourth sense operation corresponding to a fourth I/O command subsequent to the third I/O command in a third period after the third completion response is transmitted to the host and before transmission of a third interrupt to the host is started, the third interrupt indicating at least that there is the third completion response to be processed, wait for completion of a fourth data write operation or a fourth data read operation corresponding to the fourth I/O command, without transmitting the third interrupt to the host, and in response to detecting the completion of the fourth data write operation or the fourth data read operation, transmit a fourth completion response indicating completion of the fourth I/O command to the host.

6. The memory system according to claim 1, wherein the controller is further configured to:

when detecting the completion of the second sense operation in the first period, cause the nonvolatile memory to execute a data-out operation corresponding to the second I/O command, without transmitting the first interrupt to the host, and execute a decoding process for correcting an error of read data acquired by the data-out operation; and in response to the error of the read data being not corrected by a first decoding process executed in the decoding process, the first decoding process being a decoding process using a first error correction algorithm, transmit the first interrupt to the host.

7. The memory system according to claim 1, wherein each of the plurality of data read operations further includes an operation of transmitting the read data to the host, the read data being transferred to the controller by the data-out operation.

8. The memory system according to claim 1, wherein each of the plurality of data write operations further includes an operation of acquiring the write data from the host.

9. A memory system connectable to a host, the memory system comprising:

a nonvolatile memory including a page buffer and a memory cell array; and a controller electrically connected to the nonvolatile memory and configured to execute a plurality of data write operations or data read operations respectively corresponding to a plurality of input/output (I/O) commands received from the host, each of the plurality of data write operations including at least a data-in operation of transferring write data from the controller to the page buffer, and a program operation of programming the write data from the page buffer into the memory cell array, each of the plurality of data read operations including at least a sense operation of reading read data from the memory cell array to the page buffer, and a data-out operation of transferring the read data from the page buffer to the controller, wherein the controller is further configured to:

in response to detecting completion of a first data write operation or a first data read operation corresponding to a first I/O command among the plurality of I/O commands, transmit a first completion response indicating completion of the first I/O command to the host, when detecting completion of a second program operation or a second sense operation corresponding to a second I/O command subsequent to the first I/O command before time elapsed since the first completion response is transmitted reaches a time limit, wait for completion of a second data write operation or a second data read operation corresponding to the second I/O command, without transmitting a first interrupt to the host, the first interrupt indicating at least that there is the first completion response to be processed, and in response to detecting the completion of the second data write operation or the second data read operation, transmit a second completion response to the host, the second completion response indicating completion of the second I/O command, and transmit the first interrupt to the host after the second completion response is transmitted to the host; and when not detecting the completion of the second program operation or the second sense operation before the time elapsed since the first completion response is transmitted reaches the time limit, transmit the first interrupt to the host; and in response to detecting the completion of the second data write operation or the second data read operation, transmit the second completion response to the host.

10. The memory system of according to claim 9, wherein the controller is further configured to:

when detecting completion of a third program operation or a third sense operation corresponding to a third I/O command subsequent to the second I/O command in a second period after the second completion response is transmitted to the host and before transmission of a second interrupt to the host is started, the second interrupt indicating at least that there is the second completion response to be processed, wait for completion of a third data write operation or a third data read operation corresponding to the third I/O command, without transmitting the second interrupt to the host, and in response to detecting the completion of the third data write operation or the third data read operation, transmit a third completion response indicating completion of the third I/O command to the host, and transmit the second interrupt to the host after the third completion is transmitted to the host; and when not detecting the completion of the third program operation or the third sense operation in the second period, transmit the second interrupt to the host; and in response to detecting the completion of the third data write operation or the third data read operation, transmit the third completion response to the host.

11. The memory system according to claim 9, wherein the controller is further configured to:

when detecting the completion of the second program operation or the second sense operation before the time elapsed since the first completion response is transmitted reaches the time limit, determine whether a first interrupt vector associated with a completion queue of the host in which the first completion response is stored, and a second interrupt vector associated with a completion queue of the host in which the second completion response is to be stored, are a same interrupt vector, when the first interrupt vector and the second interrupt vector are the same interrupt vector, wait for the completion of the second data write operation or the second data read operation, without transmitting the first interrupt to the host, and in response to detecting the completion of the second data write operation or the second data read operation, transmit the second completion response to the host, and transmit the first interrupt to the host after the second completion response is transmitted to the host; and when the first interrupt vector and the second interrupt vector are not the same interrupt vector,
transmit the first interrupt to the host; and
in response to detecting the completion of the second data write operation or the second data read operation after the first interrupt is transmitted to the host, transmit the second completion response to the host.

12. The memory system according to claim 9, wherein the controller is further configured to:
when a number of times of transmitting a completion response to the host without transmitting the first interrupt reaches a threshold by transmitting the first completion response and the second completion response to the host without transmitting the first interrupt,
transmit the first interrupt to the host; and
in response to detecting completion of a third data write operation or a third data read operation corresponding to a third I/O command subsequent to the second I/O command, transmit a third completion response to the host, the third completion response indicating completion of the third I/O command; and when detecting completion of a fourth program operation or a fourth sense operation corresponding to a fourth I/O command subsequent to the third I/O command in a third period after the third completion response is transmitted to the host and before transmission of a third interrupt to the host is started, the third interrupt indicating at least that there is the third completion response to be processed,
wait for completion of a fourth data write operation or a fourth data read operation corresponding to the fourth I/O command, without transmitting the third interrupt to the host, and in response to detecting the completion of the fourth data write operation or the fourth data read operation, transmit a fourth completion response indicating completion of the fourth I/O command to the host.

13. The memory system according to claim 9, wherein the controller is further configured to:
when detecting the completion of the second sense operation before the time elapsed since the first completion response is transmitted reaches the time limit,
cause the nonvolatile memory to execute a data-out operation corresponding to the second I/O command, without transmitting the first interrupt to the host, and execute a decoding process for correcting an error of read data acquired by the data-out operation; and
in response to the error of the read data being not corrected by a first decoding process executed in the decoding process, the first decoding process being a decoding process using a first error correction algorithm, transmit the first interrupt to the host.

14. The memory system according to claim 9, wherein each of the plurality of data read operations further includes an operation of transmitting the read data to the host, the read data being transferred to the controller by the data-out operation.

15. The memory system according to claim 9, wherein each of the plurality of data write operations further includes an operation of acquiring the write data from the host.

16. A memory system connectable to a host, the memory system comprising:
a nonvolatile memory; and
a controller electrically connected to the nonvolatile memory and configured to execute an input/output (I/O) operation corresponding to an I/O command received from the host,
the I/O operation including at least a first operation with data transfer between the host and the controller, a second operation with data transfer between the controller and the nonvolatile memory, and a third operation with data transfer executed within the nonvolatile memory without data transfer between the controller and the nonvolatile memory, wherein
the controller is further configured to:
in response to detecting completion of the I/O operation of a first I/O command, transmit a first completion response indicating completion of the first I/O command to the host; and
when detecting completion of the third operation of a second I/O command in a first period after the first completion response is transmitted to the host and before transmission of a first interrupt to the host is started, the first interrupt corresponding to at least the first completion response,
wait for completion of the I/O operation of the second I/O command, without transmitting the first interrupt to the host, and in response to detecting the completion of the I/O operation of the second I/O command, transmit a second completion response indicating completion of the second I/O command to the host.

17. The memory system according to claim 16, wherein the controller is further configured to:
determine whether interrupt vectors associated with the first completion response and the second completion response are same; and
wait for the completion of the I/O operation of the second I/O command without transmitting the first interrupt to the host upon determining that the interrupt vectors are same.

18. The memory system according to claim 16, wherein the controller is further configured to:
during waiting for the completion of the I/O operation of the second I/O command without transmitting the first interrupt to the host, upon a number of completion responses transmitted to the host without transmitting the first interrupt reaching a threshold by transmitting a third completion response indicating completion of a third I/O command to the host, stop waiting for the completion of the I/O operation of the second I/O command and transmit the first interrupt to the host.

19. The memory system according to claim 16, wherein the controller is further configured to:
 during waiting for the completion of the I/O operation of the second I/O command without transmitting the first interrupt to the host, upon time elapsed since the transmission of the first completion response reaching a threshold, stop waiting for the completion of the I/O operation of the second I/O command and transmit the first interrupt to the host.

20. The memory system according to claim 16, wherein the controller is further configured to:
 during waiting for the completion of the I/O operation of the second I/O command without transmitting the first interrupt to the host, upon detecting an error in the I/O operation of the second I/O command, stop waiting for the completion of the I/O operation of the second I/O command and transmit the first interrupt to the host.

\* \* \* \* \*